(12) United States Patent
Smirin et al.

(10) Patent No.: US 7,703,030 B2
(45) Date of Patent: Apr. 20, 2010

(54) METHOD AND SYSTEM FOR PROVIDING CUSTOMIZED RECOMMENDATIONS TO USERS

(75) Inventors: Shahar (Boris) Smirin, Moscow (RU); Vadim Drujina, Tel-Aviv (IL); Maxim Lvovich Tokarev, Moscow (RU); Ilya Akselrod, Moscow (RU); Michael Myagkov, Petah Tikva (IL)

(73) Assignee: Trusted Opinion, Inc., Palo Alto, CA (US)

( * ) Notice: Subject to any disclaimer, the term of this patent is extended or adjusted under 35 U.S.C. 154(b) by 152 days.

(21) Appl. No.: 11/329,732

(22) Filed: Jan. 10, 2006

(65) Prior Publication Data

US 2007/0143281 A1 Jun. 21, 2007

Related U.S. Application Data

(63) Continuation-in-part of application No. 11/314,519, filed on Dec. 20, 2005.

(60) Provisional application No. 60/424,554, filed on Jan. 11, 2005.

(51) Int. Cl.
*G06F 3/00* (2006.01)
(52) U.S. Cl. ........................ 715/765; 715/751; 715/835
(58) Field of Classification Search .................. 715/751, 715/747, 745, 962, 968, 744, 733, 835, 765, 715/866, 735; 705/26, 1, 27; 707/104.1, 707/3, 5
See application file for complete search history.

(56) References Cited

U.S. PATENT DOCUMENTS

| | | | |
|---|---|---|---|
| 5,317,683 A * | 5/1994 | Hager et al. ................. 715/751 |
| 5,960,411 A | 9/1999 | Hartman et al. ............... 705/26 |
| 6,055,542 A * | 4/2000 | Nielsen et al. ........... 707/104.1 |
| 6,070,176 A * | 5/2000 | Downs et al. ............... 715/234 |
| 6,092,049 A * | 7/2000 | Chislenko et al. ......... 705/26 X |
| 6,175,831 B1 | 1/2001 | Weinreich et al. ............. 707/10 |
| 6,327,590 B1 | 12/2001 | Chidlovskii et al. ............ 707/5 |
| 6,334,127 B1 | 12/2001 | Bieganski et al. .............. 707/5 |
| 6,389,372 B1 | 5/2002 | Glance et al. ............... 702/189 |
| 6,549,889 B2 * | 4/2003 | Lauffer ......................... 705/8 |
| 6,631,184 B1 | 10/2003 | Weiner .................... 379/92.01 |
| 6,704,931 B1 * | 3/2004 | Schaffer et al. ............... 725/46 |
| 6,801,909 B2 * | 10/2004 | Delgado et al. ....... 707/104.1 X |
| 6,963,848 B1 | 11/2005 | Brinkerhoff et al. .......... 705/10 |
| 6,963,850 B1 | 11/2005 | Bezos et al. .................. 705/26 |
| 6,963,867 B2 | 11/2005 | Ford et al. ..................... 707/3 |
| 7,031,952 B1 * | 4/2006 | Heumann et al. .............. 707/1 |
| 7,181,696 B2 * | 2/2007 | Brock ......................... 715/758 |
| 2001/0023401 A1 * | 9/2001 | Weishut et al. ................. 705/1 |
| 2002/0091667 A1 | 7/2002 | Jaipuria et al. ................. 707/1 |
| 2003/0001890 A1 * | 1/2003 | Brin ........................... 345/753 |
| 2005/0091202 A1 | 4/2005 | Thomas ........................ 707/3 |

FOREIGN PATENT DOCUMENTS

| | | |
|---|---|---|
| EP | 0751471 A1 | 1/1997 |
| EP | 1065607 A2 | 1/2001 |
| EP | 1288795 A1 | 3/2003 |
| WO | WO 01/61601 A1 | 8/2001 |

* cited by examiner

*Primary Examiner*—Kieu Vu
(74) *Attorney, Agent, or Firm*—Blakely Sokoloff Taylor & Zafman LLP

(57) ABSTRACT

In one embodiment, a method includes displaying a plurality of ratings provided for an item by a plurality of users, and, for each of the plurality of ratings, graphically illustrating relevance of a corresponding rating to an information recipient.

10 Claims, 32 Drawing Sheets

← 1290

1291        1292         1293
           ↓           ↓            ↓

| NAME | RATING | CONTRIBUTING FACTORS |
|---|---|---|
| Maria Norman | 9 | ☆ |
| Simon Postford | 8 | ○ |
| Allan Truman | 7 | ▨ |
| Bryan M. | 8 | △ |
| Gernando O. | 9 | ☆ |
| Michael A. | 7 | ● |
| Anna R. | 8 | □ |
| Venera | 8 | ◬ |
| John J. | 9 | ○ |
| Boss | 5 | △ |
| Stranger | 8 | ☆ |
| Roma D. | 6 | □ |
| Bill G. | 7 | ▪ |
| Leona O. | 7 | ○ |
| Richard E. | 6 | △ |

FIG. 12D

Diagram 1

Diagram 2

Diagram 3

Diagram 4

Diagram 5

METHOD AND SYSTEM FOR PROVIDING CUSTOMIZED RECOMMENDATIONS TO USERS

CROSS-REFERENCE TO RELATED APPLICATIONS

This application is a continuation-in-part of U.S. patent application Ser. No. 11/314,519 filed on Dec. 20, 2005, which claims the benefit of U.S. Provisional Application No. 60/424,554 filed Jan. 11, 2005, entitled "A METHOD AND SYSTEM FOR PROVIDING USER SPECIFIC RECOMMENDED RESPONSES TO A USER INQUIRY," and assigned to the assignee of the present application and hereby incorporated by reference.

FIELD

Embodiments of the invention relate generally to information retrieval systems, and more specifically to providing customized recommendations to users.

BACKGROUND

The need to make choices is an essential part of anyone's life nowadays. As amount of options in each field is drastically growing in the modern world of globalization and technology advance, the complexity of making the right and informed choice becomes enormous.

Currently available online tools that assist users in making choices include, for example, "Yellow Pages"—like directories and posted public ratings of products and services. However, the "Yellow Pages"—like directories provide only a plain list of options and the publicly available ratings are often commercially sponsored. Users may also use search engines to find desired information, including answers to specific questions. However, given the massive amount of information available on the Internet, users often find themselves overwhelmed with the amount of information a search engine query may return. In addition, someone inquiring about specific goods and/or services (e.g., a user requesting a recommendation for a good camera, a good restaurant, or a good doctor) usually receives results which are based on factors not directly related to the quality of the goods and/or products for which a recommendation was requested, and these results are typically based on recommendations by individuals unfamiliar with the user's preferences, traits and/or needs.

Some users turn to online communities in an attempt to find help in making informed choices. Today, one can join an online community focusing on almost any area of interest, ranging from various hobbies to dating, to health related issues, and even to numerous aspects of commerce. People seeking information relating to a specific issue may join an online community focusing on that issue, and may ask members of that community about the desired information. However, recommendations of online community members may not always be useful. In particular, different members of the community provide different information, advice or recommendations, and it may be difficult for the user posing the question to properly aggregate and analyze information being provided concurrently from multiple sources and to identify which information or suggestion is most relevant to his or her needs. In addition, the person seeking a recommendation on a specific issue may require an immediate answer and may not have time to wait for members of a community to respond to his or her inquiry. Further, community members providing recommendations may be unfamiliar with the inquirer's personal characteristics, preferences and/or traits, and therefore their recommendations may not be customized to the specific needs of the inquirer.

Therefore, it would be advantageous to provide an improved recommendation system that enables users to receive customized recommendations from trusted sources.

SUMMARY OF THE INVENTION

According to one aspect of the present invention, an exemplary method for displaying a plurality of ratings provided for an item by a plurality of users, and, for each of the plurality of ratings, graphically illustrating relevance of a corresponding rating to an information recipient is disclosed herein.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIGS. 12A-12D show exemplary user interfaces illustrating the relevance of a plurality of ratings by a plurality of users to an information recipient, according to some embodiments of the present invention;

DESCRIPTION OF EMBODIMENTS

Figure 1:
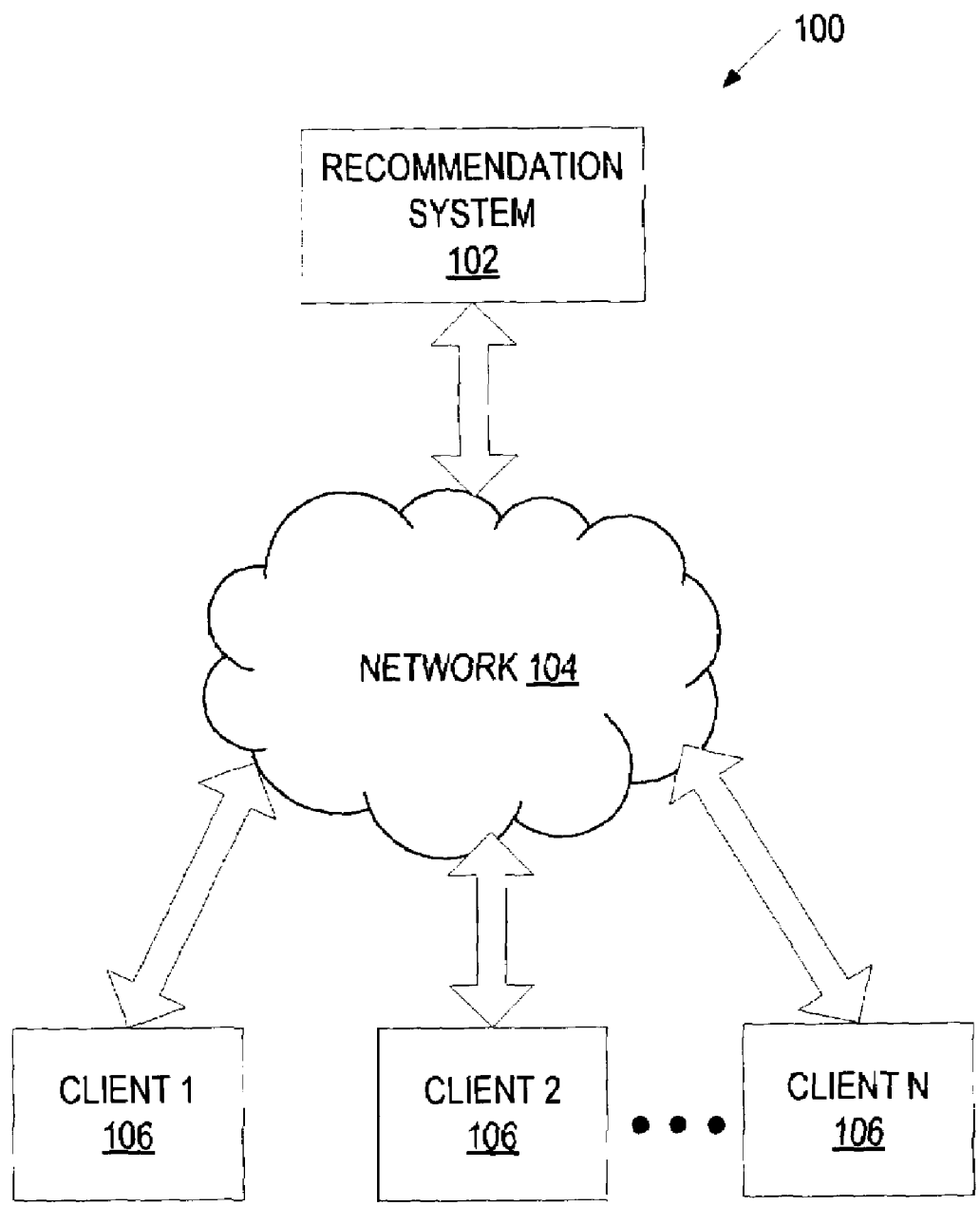
FIG. 1 illustrates an exemplary network architecture in which embodiments of the present invention may operate.

A method and apparatus for providing customized recommendations to users is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe protection of privacy of networked devices containing management subsystems in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

FIG. 1 illustrates an exemplary network architecture 100 in which embodiments of the present invention may operate. The network architecture 100 may include client devices 106 coupled with a recommendation system 102 via a network 104 (e.g., a public network such as the Internet, a private network such as a local area network (LAN), a cable television network, a satellite television network, etc.). The client devices 106 may be, for example, personal computers (PCs), mobile phones, palm-sized computing devices, personal digital assistants (PDAs), set-top boxes, television sets or other consumer electronic devices, etc.

Users of some or all clients 106 are subscribers of the recommendation system 102. The recommendation system 102 receives ratings concerning various objects from the users, stores these ratings in a database, and then uses the stored ratings to provide customized recommendations for specific objects to the users. A rating indicates a user characterization of an object. A rating may be presented in the form of a numerical value or a text description and may pertain to an object's quality, price, availability, or any other parameter. An object may represent a category, a sub-category, a specific item within a category or sub-category, or any other target that may become a subject of a recommendation request. Exemplary categories may include consumer goods and products of various types (e.g., automotive products, sporting goods, etc.), services and service providers (attorneys, doctors, etc.), leisure planning areas (restaurants, movies, hotels, air lines etc.), websites (portals, online services, vertical sites, etc.), etc.

As will be discussed in more detail below, when a user requests a recommendation for a specific object of interest, the recommendation system 102 finds ratings provided for the object of interest by subscribers that are likely to be trusted by this user, transforms these ratings into correlated recommendations based on the level of trust of the user towards the subscribers and other factors, and presents the correlated recommendations to the user. The term "recommendation" as used herein refers to any opinion or suggestion with respect to a target. Such an opinion or suggestion may, for example, be positive (e.g., indicating that the target is advisable), negative (e.g., indicating that the target is not advisable), or neutral (e.g., indicating that the target is neither advisable nor non-advisable).

The subscribers who are likely to be trusted by the user may include, for example, personal friends of the user or other people whose opinion the user may consider when evaluating a specific object. The ratings provided for the object of interest may be ratings of items associated with the object of interest. For example, if the object of interest is "automobiles", then ratings of items associated with this object of interest are ratings of specific automobile models (e.g., ratings of BMW 525i, ratings of Toyota Camry, ratings of Honda Accord, etc.). The recommendation system 102 may present to the user a list of items (e.g., BMW 525i, Toyota Camry, Honda Accord, etc.) recommended for the object of interest (e.g., automobiles) with corresponding correlated recommendations that reflect relevance of each recommendation to this user. As will be discussed in more detail below, in one embodiment, each item in the list is paired with a correlated recommendation that is calculated based on ratings provided by the trusted subscribers for the relevant item.

Accordingly, the recommendation system 102 allows a user to inquire about a certain object, automatically analyzes and aggregates recommendations associated with the inquiry, and presents to the user a list of recommendations correlated to reflect relevance of these recommendations to that specific user.

Figure 2A:
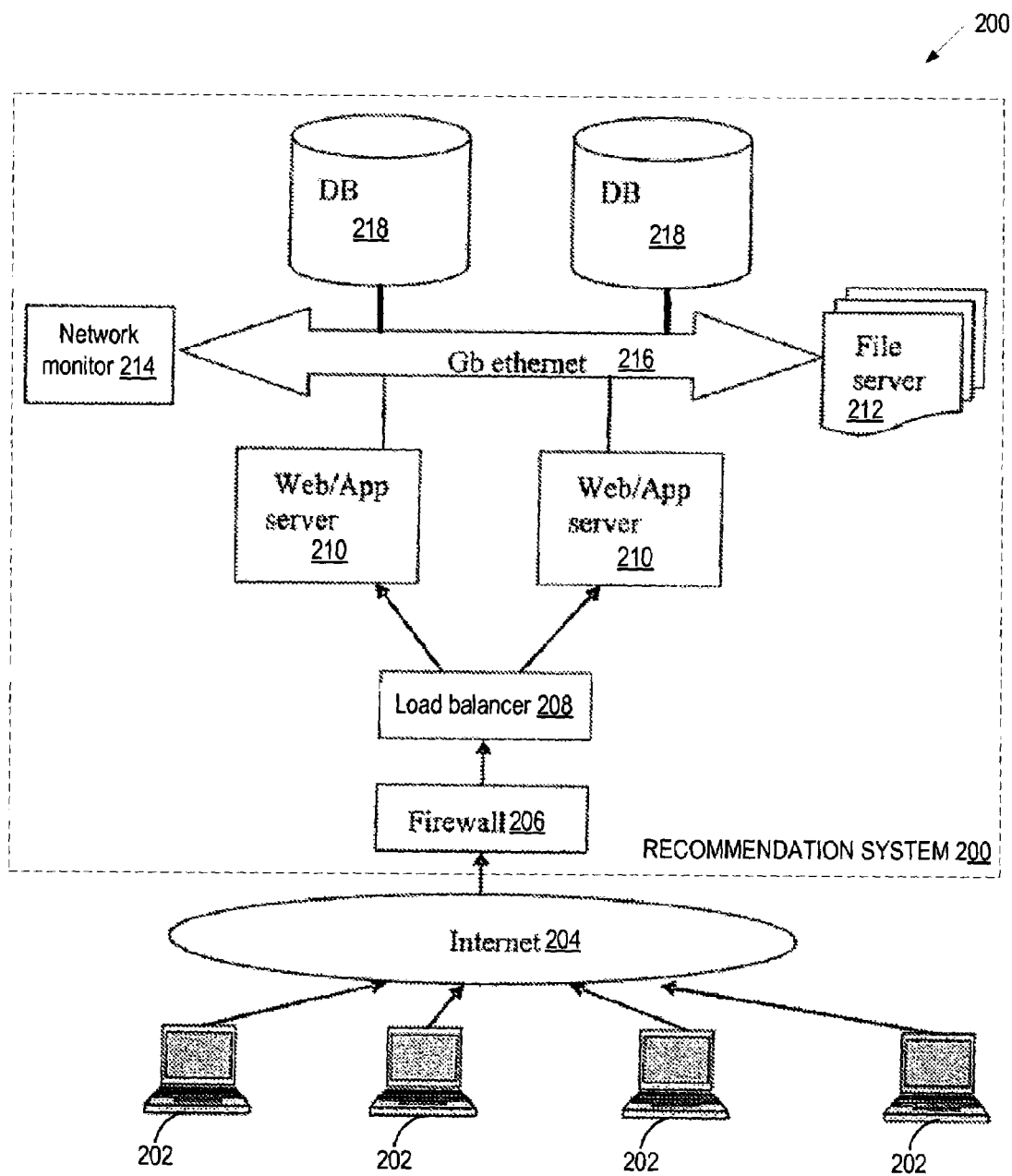
FIGS. 2A and 2B illustrate different configurations of a recommendation system according to some embodiments of the present invention.
Figure 2B:
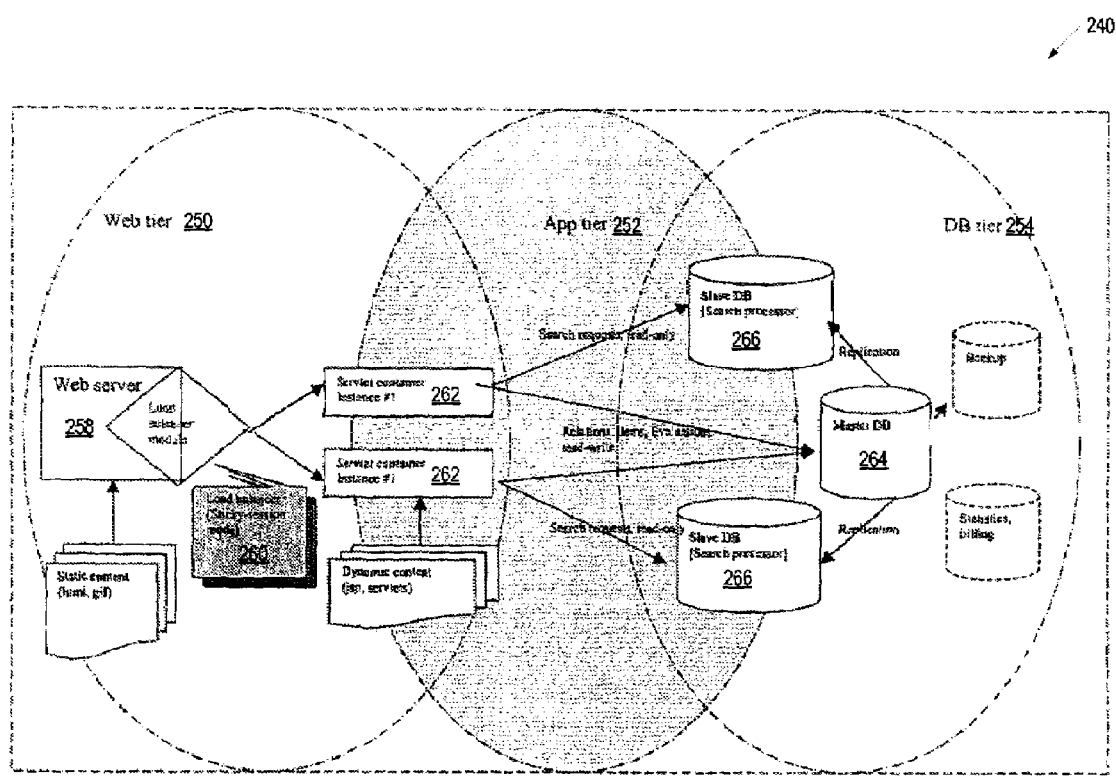

FIGS. 2A and 2B illustrate different configurations of a recommendation system according to some embodiments of the present invention.

Referring to FIG. 2A, a recommendation system 200 is coupled to client devices 202 via a public network such as the Internet 204. The recommendation system 200 includes a firewall 206 that prevents unauthorized users from accessing the recommendation system 200. The firewall 206 passes valid requests from clients 202 to a load balancer 208 that distributes the requests between web/application servers 210. The web/application severs 210 are coupled to databases 218 and file servers 212 via a local area network such as Ethernet 216. A network monitor 214 monitors communications between the databases 208, the web/application servers 210, and the file servers 212. The web/application severs 210 evaluate client requests. If a request includes data provided by the user (e.g., ratings for objects, relationships between users, etc.), the web/application servers 210 pass this data to the databases 218 and/or file servers 212 for storage. If a request asks for a recommendation concerning an object, the web/application servers 210 issue a search request to the databases 218 and/or the file servers 212 to obtain ratings associated with the object, and then transforms these ratings into correlated recommendations that will be presented to the user.

Referring to FIG. 2B, a recommendation system 240 contains three tiers: a web tier 250 that represents the front-end of the recommendation system 240, a database tier 254 that represents the back-end of the recommendation system 240, and an application tier 252 that provides an intelligent interface between the front-end and the back-end.

The web tier 250 includes a web server 258 that receives client requests and delivers web pages (e.g., markup language documents) to the clients. A load balancer 260 balances client requests and passes them to appropriate applications of the application tier 252.

The application tier 252 uses servlet containers 262 to provide data received from clients to the database tier 254 and to issue search requests for content requested by clients to search processors 206. Data received from clients is stored in a master database 264 and may include, for example, items being evaluated, user ratings of the items, relationships between users, etc. The search processors 266 replicate data from the master database 264 and search this data according to client requests (e.g., to obtain user ratings of specific items).

Figure 3:
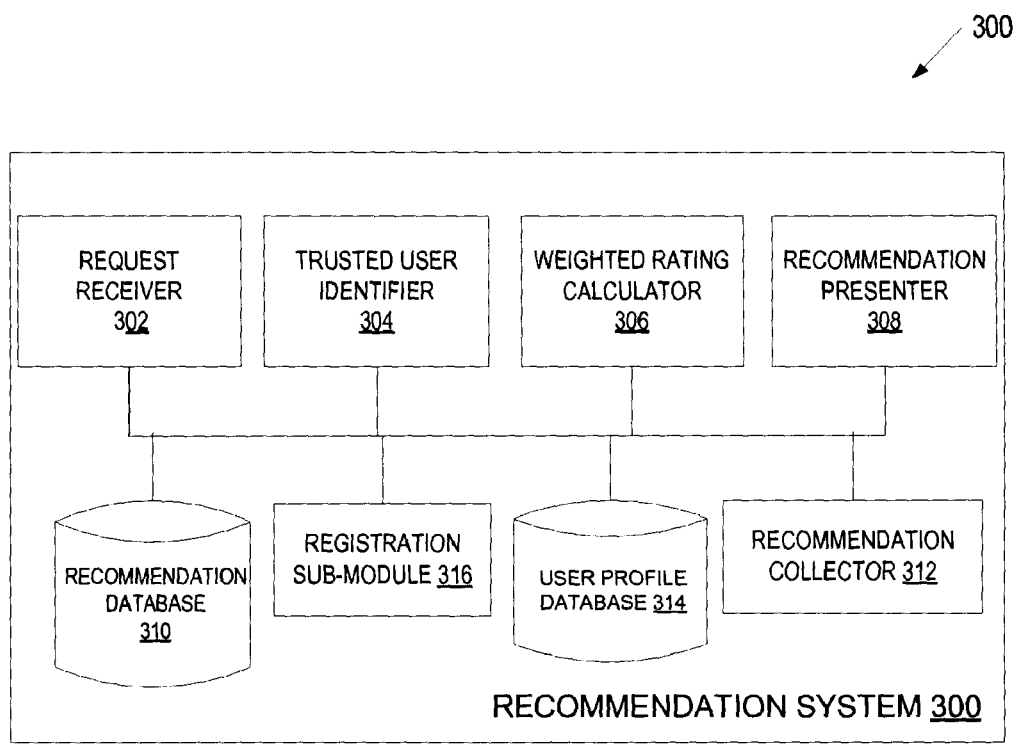
FIG. 3 is a block diagram of one embodiment of a recommendation system.

FIG. 3 is a block diagram of one embodiment of a recommendation system 300. The recommendation system 300 includes a request receiver 302, a trusted user identifier 304, a weighted rating calculator 306, a recommendation presenter 306, a recommendation collector 312, a recommendation database 312, a user profile database 314, and a registration sub-module 316.

The registration sub-module 316 handles registration of new users. In one embodiment, any user can register with the recommendation system 300. Alternatively, only users satisfying predefined criteria (e.g., only users invited by existing members) can register with the recommendation system 300 to protect the recommendation system from entities pursuing commercial interests or for other reasons. The registration sub-module 316 collects user preferences and stores them in the user profile database 314.

In one embodiment, the registration sub-module 316 also asks the user to invite individuals the user trusts to join the recommendation system 300. The user may invite these individuals by, for example, sending an email or an IM message. In another embodiment, the user may identify the trusted individuals to the registration sub-module 316 (e.g., in an email address book or an IM roster), which will then automatically send a message with an invitation to register with the recommendation system 300 to each of these individuals. In yet another embodiment, the registration sub-module 316 may automatically identify individuals that the user is likely to trust by evaluating user communications with others (e.g., email messages, phone calls, IM messages, etc.) or other parameters, and then either automatically register the identified individuals with the recommendation system 300 or invite the identified individuals to register with the recommendation system 300. The registration sub-module 316 stores data identifying trusted individuals in the user profile database 314.

In one embodiment, the registration sub-module 316 also asks the user to specify his or her level of trust towards each invited individual, and then stores this information in the user profile database 314. Alternatively, the registration sub-module 316 may automatically determine the user level of trust towards each invited individual by evaluating the communications between the user and the invited individual (e.g., the frequency of communications, the nature of communications, etc.), profiles of the user and invited individuals, behavioral patterns of the user and each invited individual (e.g., whether they have visited the same web sites, purchased the same products online, responded similarly to online surveys, etc.), and various other similar factors and combinations thereof. In addition, the registration sub-module 316 may obtain various other characteristics of invited individuals (e.g., expertise in specific areas, behavioral patterns, common past, common interests, common occupation, etc.) and store these characteristics in the user profile database 314. In one embodiment, the recommendation system 300 periodically re-evaluates the user level of trust to each invited individual using the factors described above. In addition, the recommendation system 300 continues to collect characteristics of invited individuals during their usage of the system after the registration is completed.

In one embodiment, the registration sub-module 316 may also ask the new user to provide a number of ratings as part of the registration process, and then store these ratings in the recommendation database 310. For example, the new user may be allowed to select an object (e.g., a restaurant, a car, a hotel, etc.), and then provide a rating for one or more items associated with this object (e.g., ratings for specific car models or specific restaurants).

The recommendation collector 312 is responsible for collecting ratings from existing users of the recommendation system 300. For example, the recommendation collector 312 may send a request for ratings to an existing user upon determining that this user has received a predefined number of recommendations from the recommendation system 300. In addition, the recommendation collector 312 may periodically identify new (popular) objects or objects that have an insufficient number of ratings and ask users to rate those items. As will be discussed in more detail below, in one embodiment, a user-friendly wizard is provided that motivates users to rate specific items (e.g., items sponsored by manufacturers, popular items, etc.). Upon receiving the ratings, the recommendation collector 312 stores them in the recommendation database 310, along with information identifying the rating providers and the time (e.g., timestamps) of obtaining the ratings.

The request receiver 302 is responsible for receiving user requests concerning objects of interest and parsing the requests to identify the objects of interest and the identity of the users that are interested in these objects. The requests concerning objects of interest may include user requests for recommendations or system-generated requests for recommendations. A system-generated request may be triggered when a user access a certain website, enters a certain part of a website, or performs some other action.

The trusted user identifier 304 is responsible for identifying other users that a recommendation recipient is likely to trust and then retrieving ratings provided for the requested object by the trusted users from the recommendation database 310. In one embodiment, the trusted user identifier 304 identifies trusted users by first associating users with different trust circles. The association may be performed based on input provided by the recommendation recipient, or based on relationships inferred from communications of the recommendation recipient with other users, or based on other parameters. For example, the trusted user identifier 304 may associate users identified by the recommendation recipient as trusted with the first circle of trust (the closest circle of trust). These users may be personal friends of the recommendation recipient and/or some other individuals whose opinion the recommendation recipient may rely on when evaluating various objects. Further, the trusted user identifier 304 may associate users identified by each user from the first circle as trusted with the second circle of trust, and so on. The association may continue until a predefined number of circles of trust is created (e.g., four circles of trust). Alternatively, the association may continue until the number of users associated with the circles of trust exceeds a predefined threshold.

In another embodiment, the trusted user identifier 304 identifies trusted users without utilizing trust circles, but rather based on communications between the users, behavioral patterns of the users, profiles of the users, and other similar factors. In one embodiment, the trusted user identifier 304 assigns each trusted user a trust coefficient that indicates the level of trust between the recommendation recipient and this user.

In one embodiment, users trusted by the recommendation recipient may include experts in certain fields. The trusted user identifier 304 may identified an expert trusted by the recommendation recipient based on input provided by the recommendation recipient or automatically based on the behavior of the recommendation recipient (e.g., the frequency with which the recommendation recipient accesses web pages presenting the opinion of the expert, the amount of time the recommendation recipient spends viewing the web pages presenting the expert's opinion, etc.).

The weighted rating calculator 306 is responsible for transforming ratings provided by the trusted users for the object of interest into one or more correlated recommendations based on the level of trust of the recommendation recipient towards corresponding trusted users. As discussed above, the level of trust may be specified by the recommendation recipient (e.g., during the registration process or when a corresponding trusted user joins the recommendation system 300). In one embodiment, the level of trust may coincide with the identifier of the circle of trust to which the user belongs. Alternatively, the level of trust may be different from the identifier of the circle of trust. For example, users A and B may both be personal friends of recommendation recipient C and as such belong to trust circle 1. However, recommendation recipient C may assign a higher level of trust to user A because recommendation recipient C trusts the opinion of user A more than the opinion of user B.

In one embodiment, the weighted rating calculator 306 uses some other factors, in addition to the level of trust, when transforming the ratings of trusted users into correlated recommendations. These factors may include, for example, knowledge or expertise of a trusted user in the field of inquiry, a period of time since the given rating was provided, the number of ratings provided for this object, features of similarity between the recommendation recipient and other users, etc. Some embodiments of transforming ratings of trusted users into correlated recommendations will be discussed in more detail below.

The recommendation presenter 306 is responsible for presenting the correlated recommendations to the recommendation recipient. The correlated recommendations may be presented to the user with corresponding items recommended for the object of interest and may reflect relevance of each recommendation to the recommendation recipient. The recommended items may be ordered by correlated recommendations. The recommendation recipient may be allowed to select a specific item from the list to obtain more detailed information about the selected item.

Figure 4:
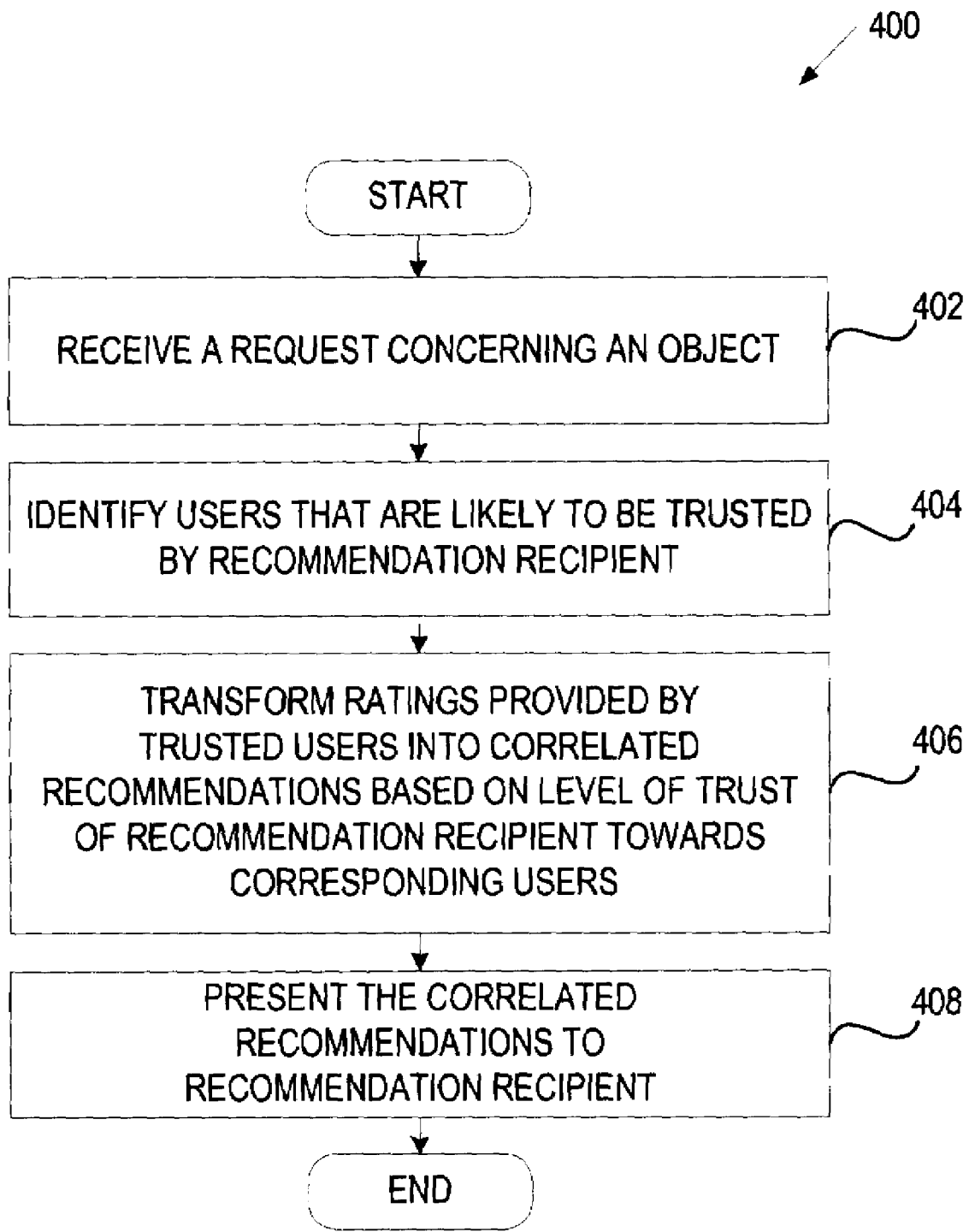
FIG. 4 is a flow diagram of one embodiment of a process for providing customized recommendations to users.

FIG. 4 is a flow diagram of one embodiment of a process 400 for providing customized recommendations to users. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 400 is performed by a recommendation system 300 of FIG. 3.

Referring to FIG. 4, process 400 begins with processing logic receiving a request concerning an object of interest (block 402). The request concerning an object of interest may be a user request for recommendation or a system-generated request for recommendation.

A system-generated request may be triggered when a user access a certain website, enters a certain part of a website, or performs some other action. An object of interest may represent a category (e.g., an attorney), a sub-category (e.g., a patent attorney), a specific item within a category or sub-category (e.g., attorney A, B and C), or any other target that may become a subject of a recommendation request.

Alternatively, block 402 may not be part of process 400. For example, if the recommendation system only maintains ratings for a single object of interest (e.g., movies), a request identifying such a single object of interest may not be needed.

At block 404, processing logic identifies users that are likely to be trusted by the recommendation recipient. The trusted users may be friends of the recommendation recipient, members of the same community such as a church community or alumni community, or any other individuals whose opinion the recommendation recipient may rely on when looking for advice or making a choice. The trusted users may be identified based on input provided by the recommendation recipient. Alternatively, processing logic may identify the trusted users by evaluating communications of the recommendation recipient (e.g., email messages, IM messages, online chats or forums communication, sent greeting cards, mobile phone calls, voice over IP (VoIP) calls, video calls, etc.) or evaluating the recommendation recipient's relationships defined by any kind of a social network or by other parameters. One embodiment of a process for identifying trusted users will be discussed in more detail below in conjunction with FIG. 8.

At block 406, processing logic transforms ratings provided by the trusted users for the object of interest into one or more correlated recommendations based on the level of trust of the recommendation recipient towards corresponding trusted users. In one embodiment, prior to transforming ratings, processing logic first identifies a set of items associated with the object of interest and retrieves ratings provided for these items of interest by the trusted users. The set of items may be specified in the request or found in the database based on the object of interest.

The level of trust may be specified by the recommendation recipient or inferred by processing logic based on the frequency and nature of communications between the recommendation recipient and the trusted users or based on other parameters. In one embodiment, processing logic uses additional factors, along with the level of trust, when transforming the ratings of trusted users into correlated recommendations. These factors may include, for example, knowledge or expertise of a trusted user in the field of inquiry, a period of time since the given rating was provided, the number of ratings provided for this object, features of similarity between the recommendation recipient and other users, etc. One embodiment of a process for transforming ratings of trusted users into correlated recommendations will be discussed in more detail below in conjunction with FIG. 5.

At block 408, processing logic presents the correlated recommendations to the recommendation recipient. The correlated recommendations may be presented to the recommendation recipient with corresponding items recommended for the object of interest. The correlated recommendations reflect relevance of each recommendation to the recommendation recipient. The presented data may be ordered by correlated recommendations.

Figure 5:
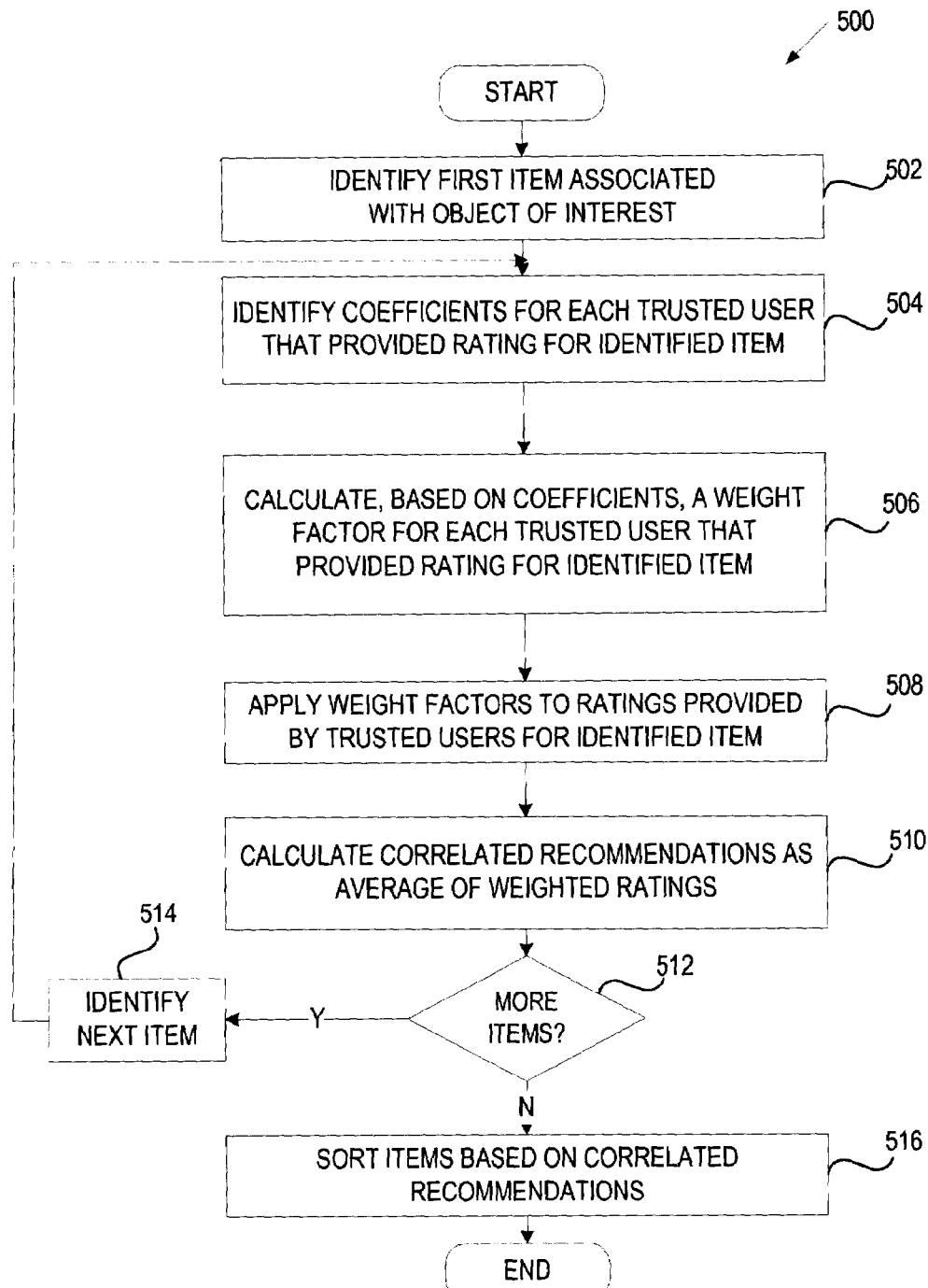
FIG. 5 is a flow diagram of one embodiment of a process for transforming rating provided by trusted users for an object into correlated recommendations.

FIG. 5 is a flow diagram of one embodiment of a process 500 for transforming rating provided by trusted users for an object of interest into correlated recommendations. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 500 is performed by a recommendation system 300 of FIG. 3.

Referring to FIG. 5, process 500 begins with processing logic finding a set of items associated with the object of interest and identifying the first item in this set (block 502).

Next, processing logic identifies coefficients for each trusted user that provided rating for the identified item (block 504). The coefficients correspond to various factors. Exemplary factors may include a level of trust, knowledge or expertise of a trusted user in the field of inquiry, a period of time since the given rating was provided, the number of ratings provided for this object, features of similarity between a recommendation recipient and other users, etc.

One embodiment of calculating a trust level coefficient will now be discussed in more detail. In particular, for a trust level coefficient $W(d)$, a linear dependence of trust circle identifier d is used, where a value of 1 is assigned to the first trust circle and some predefined value c is assigned to the last trust circle (the trust circle=4). The value of "c" is a subject of tuning. For distance>4, c drops to 0.

$$\text{For } 0 < d <= 4 : w = 1 - (1-c)\frac{d-1}{3} \text{ where } 0 < c < 1 \quad (1)$$
$$\text{For } d > 4 : w = 0$$

Figure 17:
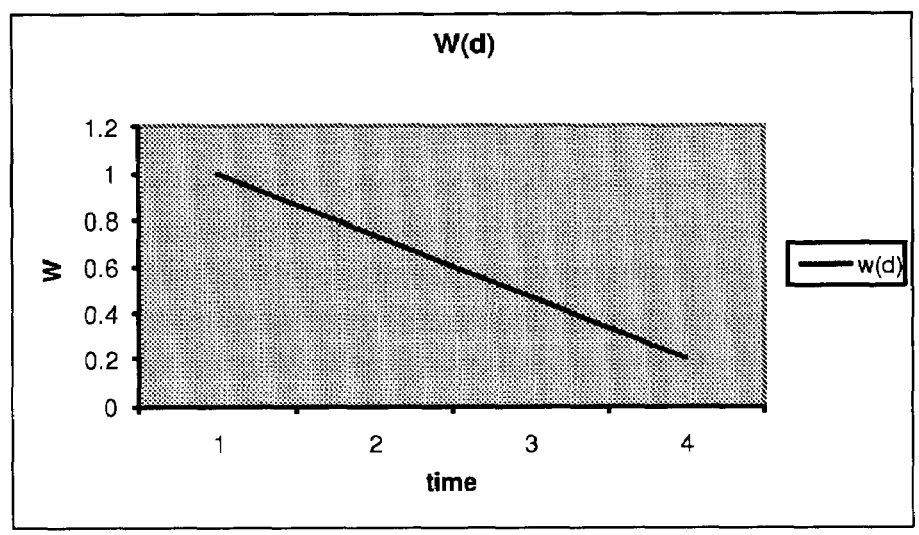
FIG. 17 is an exemplary diagram illustrating the calculation of a trust level coefficient in accordance with one embodiment.

FIG. 17 is an exemplary diagram illustrating the calculation of a trust level coefficient in accordance with one embodiment.

One embodiment of calculating a timing coefficient for a period of time since the given rating was provided will now be discussed in more detail. This coefficient is referred to herein as a date of rating (DoR) coefficient. As more time passes from the DoR, the smaller the DoR coefficient becomes. First, the DoR is transformed into the number of days that have passed since the rating was provided:

$$DoRD = TODAY - DoR + 1 \quad (2)$$

In one embodiment, the coefficient derived from DoRD is specific to item's sub-category. The quality of certain services may be more volatile than others, at the same time the quality of consumer goods can hardly be considered volatile.

The following reverse quadratic formula may be used to calculate the timing coefficient:

$$w = \frac{1}{(\gamma x^2 + \delta)} + c; \ 0 < \gamma < 1, \ c < 0 < 1, \quad (3)$$
$$\delta = \frac{1}{1-c}$$

Figure 18:
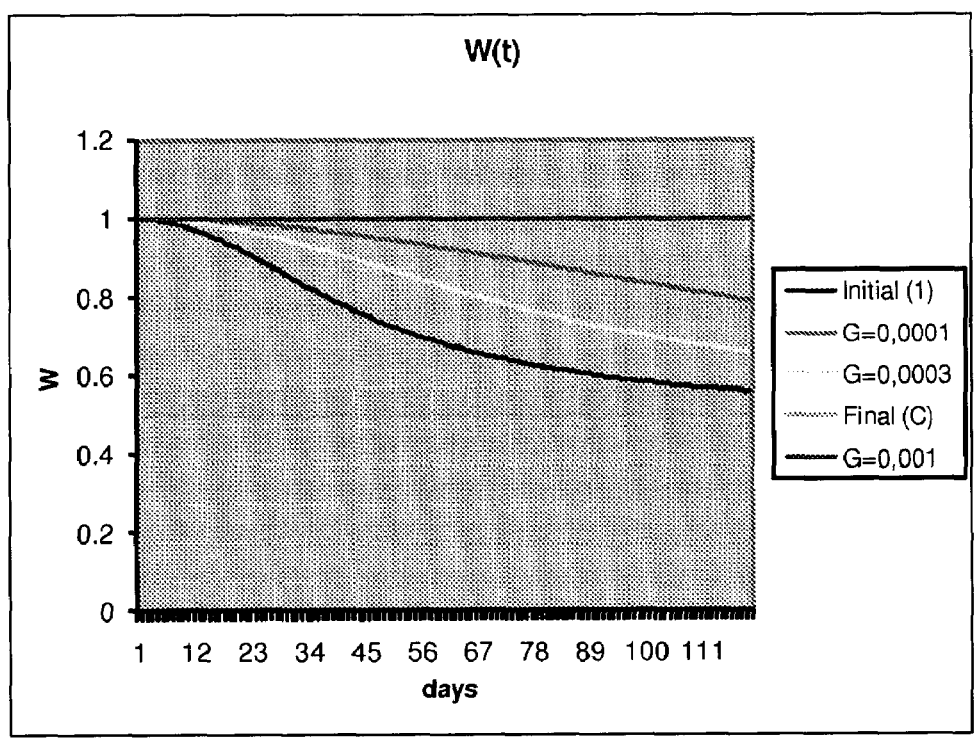
FIG. 18 is an exemplary diagram illustrating the calculation of a date of rating coefficient in accordance with one embodiment.

If c=C, γ=G, then C is a final weight (at infinity); G is a slope factor. FIG. 18 is an exemplary diagram illustrating the calculation of a date of rating coefficient in accordance with one embodiment. In particular, FIG. 18 shows WDoR for C=0,5 and G=(0,001, 0,0003, 0,0001).

Figure 19:
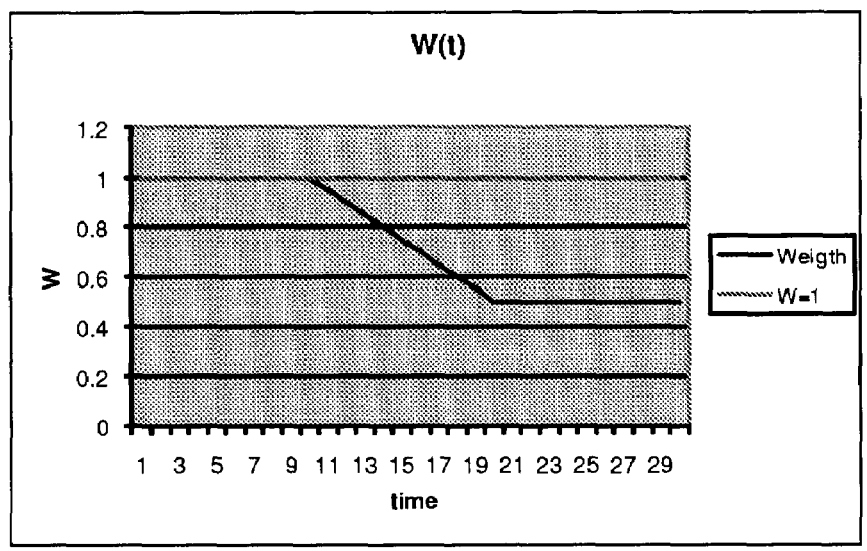
FIG. 19 is an exemplary diagram illustrating the calculation of a date of rating coefficient in accordance with another embodiment.

If the timing coefficient is not used, WdoR may be set to 1. Alternatively, a linear function may be used. FIG. 19 illustrates an exemplary diagram showing the calculation of a date of rating coefficient in accordance with another embodiment in which a linear function is used.

The following formula may be used to calculate a timing coefficient using a linear function, in which C is a final weight, D0 is the number of days before starting to degrade, D1 is the number of days before stopping to degrade at level C.

$$w = 1 - (1-c)\frac{d-d_0}{d_1-d_0} \text{ where } d_0 < d < d_1 \quad (4)$$

$$w = 1 \text{ where } d < d_0$$

$$w = r \text{ where } d > d_1$$

One embodiment of calculating a user expertise coefficient UE will now be discussed in more detail. In one embodiment, UE is calculated using automated assessment of user expertise. Such UE, referred to as an automated user expertise coefficient (AUE), depends on the number of evaluations made by the user within the same sub-category or category as the item being evaluated, or the total number of items evaluated by the user, or some predefined selection of categories/subcategories that may or may not relate to the item being evaluated. In one embodiment, AUE of a user is derived based on the user's data such as the user's education or occupation, the field of expertise provided by the user, etc.

In one embodiment, AUE is specific to item's sub-category, and different "expertise" thresholds may be used depending on sub-category. For example, a person who rated 3 restaurants may not be considered as a restaurant expert while a person who rated 3 dentists may be considered as a dentist expert. AUE may be determined by first calculating the number of user ratings NUE made within the same sub-category. Then, a piecewise-linear function is applied to calculate we(e)=AUE, where R is an expert's rating (1<R<2), N0 is the number of ratings before starting to upgrade, N1 is the number of ratings before stopping to upgrade at expert level R.

$$we(e) = AUE = 1 + (R-1)\frac{n-n_0}{n_1-n_0} \text{ where } n_0 < n < n_1 \quad (5)$$

$$we(e) = AUE = 1 \text{ where } n < n_0$$

$$we(e) = AUE = R \text{ where } n > n_1$$

Figure 20:
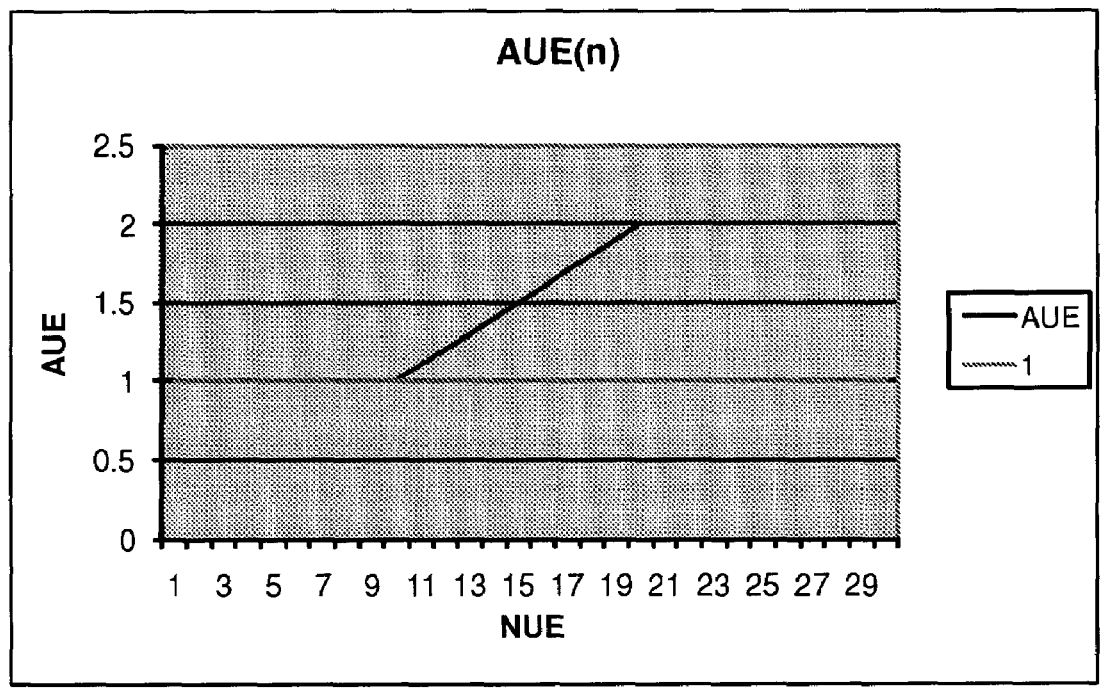
FIG. 20 is an exemplary diagram illustrating the calculation of a user experience coefficient in accordance with one embodiment.

FIG. 20 is an exemplary diagram illustrating the calculation of a user experience coefficient in accordance with one embodiment.

In another embodiment, UE is determined using manual assessment of user expertise. Such UE, referred to as manual user expertise coefficient (MUE), depends on MUE factor manually assigned by the recommendation recipient to the user. The factor may start from the value of 0 (no expertise) and go up to some pre-defined positive value (an expert). Since the value of we(e)=MUE is explicitly defined by the user, no formula is needed. MUE may vary from 0 to MAX_MUE, where 0 indicates that the evaluations of this user should be discarded and MAX_MUE indicates that this user is an expert.

In yet another embodiment, a composite assessment of UE (CUE) is calculated by multiplying AUE by MUE, thus combining both "objective/absolute" and "subjective/relative" factors. The value of we(e)=CUE is calculated according to the following formula:

$$we(e)=CUE=AUE*MUE \quad (6)$$

Referring again to FIG. 5, at block 506, processing logic calculates a weight factor for each trusted user based on the above coefficients. In one embodiment, processing logic calculates a weight factor for a trusted user by multiplying the coefficients associated with the trusted users.

Next, processing logic applies weight factors to ratings provided by corresponding trusted users for the first item (block 508) and calculates a correlated recommendation for the item as an average of weighted ratings (block 510). In one embodiment, a simple average is calculated as a scalar value using the following formula in which a set of values $\{V\}_n=\{v_1, v_2, \ldots, v_n\}$, and an associated set of weights $\{W\}_n=\{w_1, w_2, \ldots, w_n\}$, so that each $w_i$ is non-negative and at least one $w_i$ is positive and n is the number of evaluations.

$$Aw = \frac{\sum_{i=1}^{n} vi*wi}{\sum_{i=1}^{n} wi} \quad (7)$$

In another embodiment, a composite average is calculated for multiple weighted factors. Every $w_i$ is a product of the corresponding single weight, which can be calculated using the following formula, were m is the number of single types of weights per evaluation:

$$w_i = \prod_{j=1}^{m} w_{ij} \quad (8)$$

If the rated value is r, and weights wt(t), we(e), wd(d) are certain functions of t, e, d respectively, with each of these weights being either a constant or decrease or a combination of both, then the composite average may be calculated using the following formula:

$$Rt = \frac{\sum_{i=1}^{n} r_i * w_i}{\sum_{i=1}^{n} w_i} \quad (9)$$

where $w_i$=$wt_i(t)*we_i(e)*wd_i(d)*wx(x)$.

Still referring to FIG. 5, if processing logic determines that there are more rated items associated with the object of interest (block 512), processing logic identifies the next item rated by at least one trusted user (block 514) and returns to block 504. Otherwise, processing logic sorts the items based on corresponding correlated recommendations calculated at block 510 (block 516), and process 500 ends.

Figure 6:
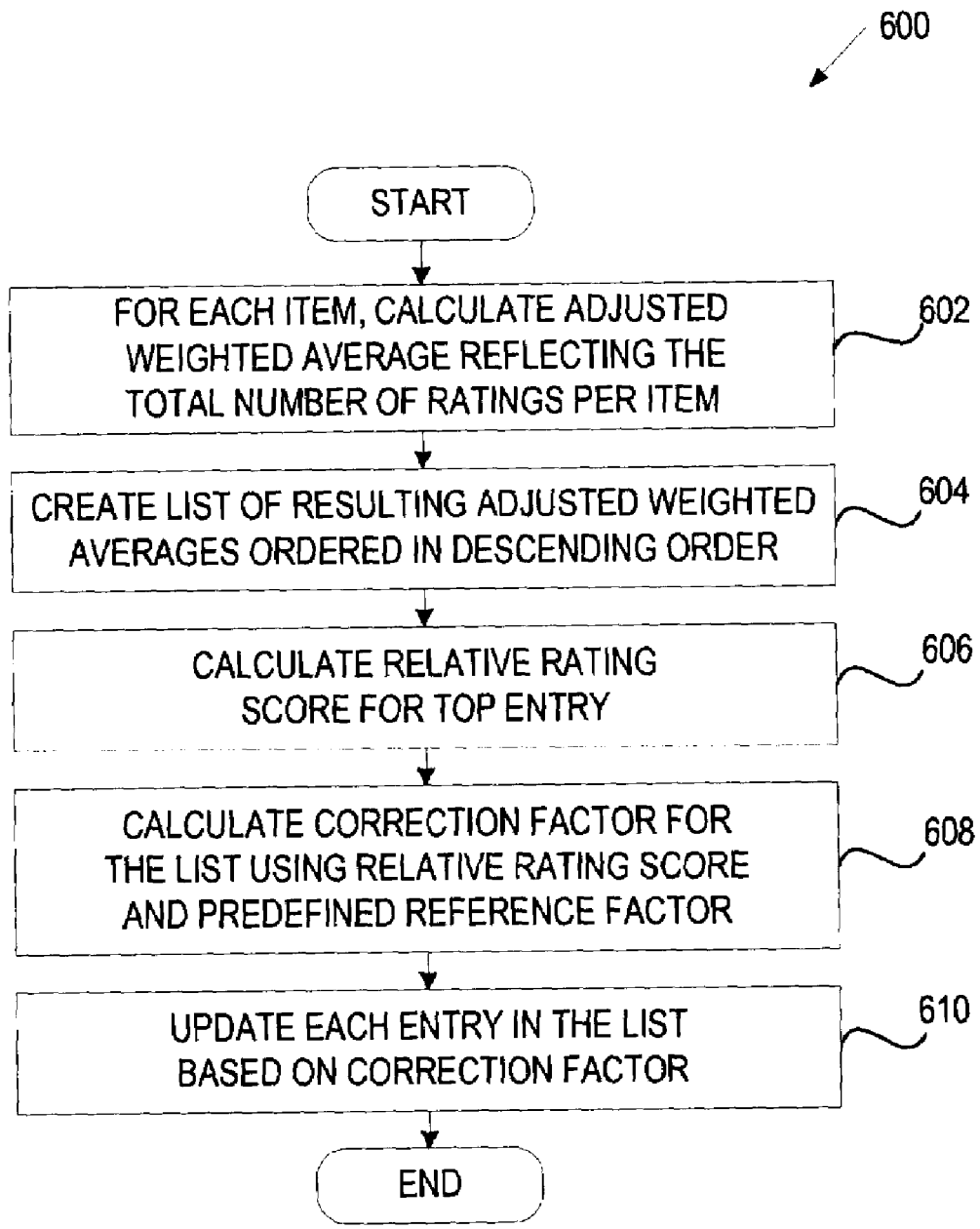
FIG. 6 is a flow diagram of one embodiment of a process for adjusting correlated recommendations based on the number of ratings provided for corresponding items.

FIG. 6 is a flow diagram of one embodiment of a process 600 for adjusting correlated recommendations based on the number of ratings provided for corresponding items. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 600 is performed by a recommendation system 300 of FIG. 3.

Referring to FIG. 6, process 600 begins with calculating, for each rated item, an adjusted weighted average reflecting the total number of existing ratings per item (block 602). In one embodiment, in order to take into account the number of ratings (the more ratings are given, the more objective is their composite weighted average value) and to guarantee that the result depends on all involved parameters in every exceptional case (e.g., when all ratings are at the same level, or all ratings were provided at the same time, etc.), the following adjustment formula can be used:

$$Rt = \frac{\sum_{i=1}^{n} r_i * w_i + R_0 * D}{\sum_{i=1}^{n} w_i + D} \quad (10)$$

where $w_i=wt_i(t)*we_i(e)*wd_i(d)*wx(x)$, $R_0$ is some predefined ideal Reference Rating, and weight $D=wd(1)+wd(2)+wd(3)+wd(4)$, with wd(1) corresponding to trust circle 1, wd(2) corresponding to trust circle 2, etc.

Weight D is defined to guarantee that the result depends on all involved parameters in every exceptional case. By using formula (10), the number of ratings is taken into account such that the more ratings are provided for the item, the less weight Reference Rating has in the formula, and therefore the closer is the relative rating to ratings given to the item. In addition, the more ratings are given to the item, the more objective is the result. Hence, if the number of ratings is high, the result is close to composite weighted average value in accordance with formula (9). If the number of ratings is lower, the result becomes closer to the Reference Rating as a set of real ratings can be considered non-representative.

Next, processing logic normalizes the relative ratings to eliminate the influence of the Reference Rating. In particular, processing logic creates a list of resulting weighted averages ordered in the descending order (block 604), with the top item (the item with the largest $R_t$) taken as a reference item with its rating equal to $R_r$. Then, processing logic calculates a relative ranking score $R_r$ for the top entry in the list using formula (9) (block 606). Further, processing logic calculates a correction factor Fc for the list using the relative rating score $R_r$ and a predefined reference factor $F_{r2}$ (e.g., if $R_r>6$, $F_{r2}=5$, otherwise $F_{r2}=0.5$) (block 608). Correction factor Fc may be calculated using the following formula:

$$F_c=(R_r-F_{r2})/(R_t-F_{r2}) \quad (11)$$

Afterwards, processing logic updates each entry in the list using the correction factor Fc (block 610).

In another embodiment, the process of adjusting correlated recommendations based on the number of ratings does not include the normalization discussed above. Instead, a correlated recommendation is adjusted using an additional coefficient corresponding to the number of ratings stored for a relevant item. For example, for 1-4 ratings per item, a ratings number coefficient of 0.5 may be used for a relevant recommendation; for 5-10 ratings per item, a ratings number coefficient of 0.75 may be used for a relevant recommendation; and for more than 10 ratings per item, a ratings number coefficient of 1.0 may be used for a relevant recommendation.

Figure 7A:
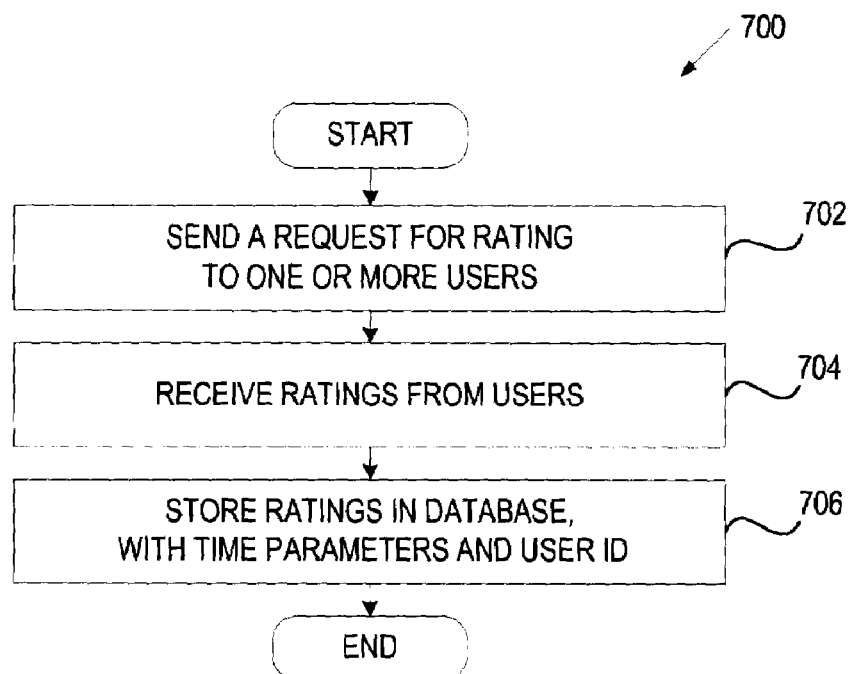
FIGS. 7A and 7B are flow diagrams of two embodiments of a process for collecting user recommendations.
Figure 7B:
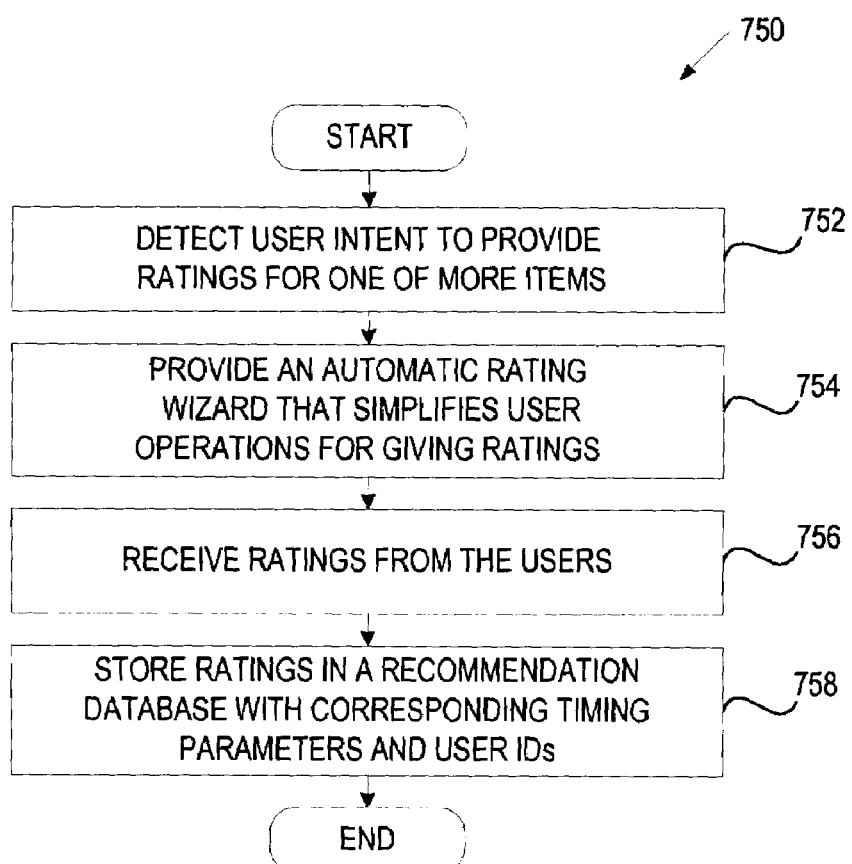

FIGS. 7A and 7B are flow diagrams of two embodiments of a process for collecting user recommendations. The process may be performed by processing logic that may comprise hardware (e.g., circuitry, dedicated logic, programmable logic, microcode, etc.), software (such as that run on a general purpose computer system or a dedicated machine), or a combination of both. In one embodiment, the process is performed by a recommendation system 300 of FIG. 3.

Referring to FIG. 7A, process 700 begins with sending a request to provide ratings to one or more users (block 702). In one embodiment, the request is sent to a new user when the new user registers with the recommendation system, and asks the new user to provide a predefined number of ratings for a category and/or sub-category selected by the user or for a specific category, sub-category or item. In another embodiment, processing logic sends a request for ratings to an existing user upon determining that this user has received a predefined number of recommendations from the recommendation system. In yet another embodiment, processing logic sends requests for ratings on behalf of a user to members trusted by this user (e.g., the user's first circle of friends) to recommend a specific item or several items in a specific category. In still another embodiment, processing logic periodically identifies new (popular) categories or items, or existing categories or items that have an insufficient number of ratings, and request users to rate those items. A user-friendly rating wizard may be used to motivate users to provide ratings. A wizard may be used as a tool for achieving various business goals of an organization. For example, an organization maintaining the recommendation system 102 may use the rating wizard to obtain consumers' opinions with respect to certain products and then sell those opinions to a product manufacturer. In another example, a product manufacturer may maintain the recommendation system 102 and use the rating wizard to conduct testing of their new products (e.g., if a toothpaste manufacturer sells a new toothpaste in Chicago, the rating wizard may be used to push users of the recommendation system who reside in Chicago to rate the new toothpaste, thus allowing the toothpaste manufacturer to obtain objective consumer opinion about the new toothpaste).

Next, processing logic receives ratings from the users (block 704) and stores these ratings in a recommendation database with corresponding timing parameters (e.g., timestamps) and user IDs (block 706).

Referring to FIG. 7B, process 750 begins with processing logic detecting user intent to provide ratings for one or more items (block 752). In one embodiment, the user intent is detected when the user selects an option to add a rating for a new item. In another embodiment, the user intent is detected when the user selects an option to add a rating for an existing item (e.g., an item identified to the user by processing logic).

Upon detecting the user intent to provide ratings, processing logic provides an automatic rating wizard that simplifies user operations for providing ratings (block 754). For example, for a new item, the wizard allows the user to select a category of the new item, and then lists various options for data to be specified for this new item so that the user can merely select the desired options rather than manually entering data for various fields.

Next, processing logic receives ratings from the users (block 756) and stores these ratings in a recommendation database with corresponding timing parameters (e.g., timestamps) and user IDs (block 758).

Figure 8:
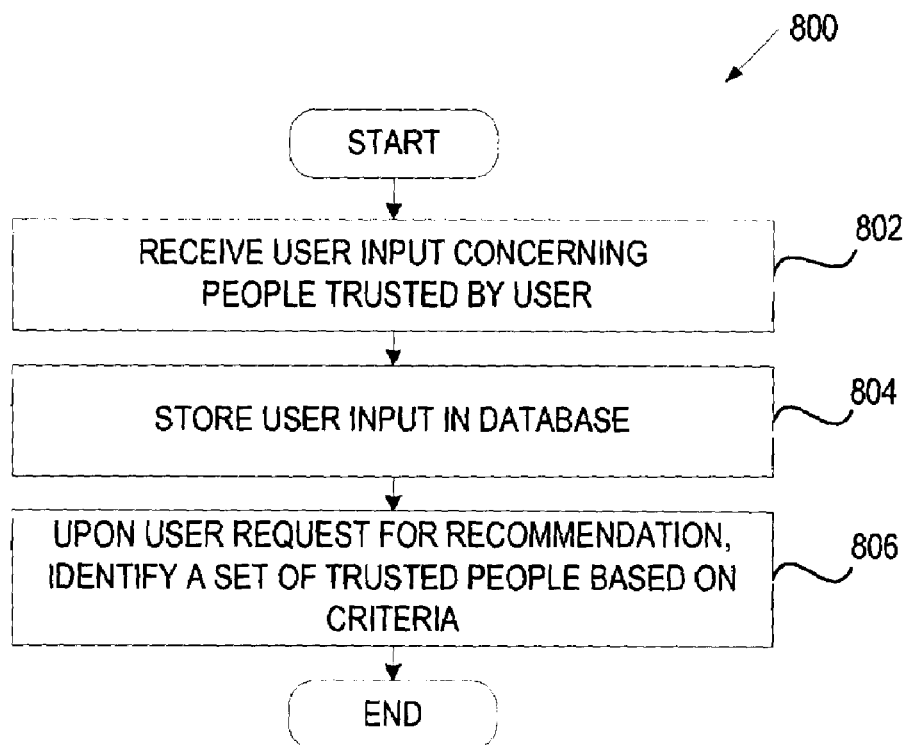
FIG. 8 is a flow diagram of one embodiment of a process identifying a set of users that a recommendation recipient is likely to trust.

FIG. 8 is a flow diagram of one embodiment of a process 800 for identifying a set of users that a recommendation recipient is likely to trust. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 800 is performed by a recommendation system 300 of FIG. 3.

Referring to FIG. 8, process 800 begins with receiving user input concerning people trusted by the user (block 802). In one embodiment, this input is provided when the user registers with the recommendation system. In one embodiment, processing logic may also ask the user to provide input concerning a specific individual when this individual joins the recommendation system. Alternatively, processing logic may periodically ask the user to view a list of members that have recently joined the recommendation system and identify the members that the user trusts. In still another embodiment, processing logic may periodically ask the user to invite new members this user trusts to join the system.

At block 804, processing logic stores the user input in a user profile database. In one embodiment, in which a social network is maintained to reflect relationships among members, processing logic updates the social network based on the user input.

At block 806, processing logic identifies a set of members that the user is likely to trust upon receiving a request pertaining to an object of interest. In one embodiment, processing logic identifies trusted members by first associating members with different trust circles. The association may be performed based on input provided by the user and other members or based on relationships inferred from communications of the user with other members. The number of trusted users may be limited by the number of circles of trust (e.g., only 4 circles of trust can be considered when identifying trusted people) or by the number of trusted members (e.g., only 50 members can be included in the set of trusted people). Alternatively, the above criteria may be combined. For example, the combined criteria may require that members be included in the set of trusted people until the set exceeds 50 members or until the fifth level of trust is reached. In one embodiment, the set of trusted people is extended to include members with similar interests. In particular, processing logic may compare the behavior of the user requesting the recommendation with the behavior of other members (e.g., in a specific category or in all categories). If members with similar behavior are found, they may be included in the set of trusted members. Alternatively, they may be processed separately from the trusted members. That is, processing logic may calculate separate correlated recommendations based on ratings provided by members with similar interests, and then show these correlated recommendations separately from other recommendations.

In one embodiment, when processing logic finds members with similar interests, it asks these members if they want to include each other in their respective circles of trust.

In one embodiment, processing logic allows users to join groups of interest (e.g., extreme sports, hiking, computer geeks etc) or automatically add the users to those groups based on interests they identified in their profiles. Processing logic may then assume that members of a group have some kind of trust relationships to each other in relevant to this group categories (e.g., group members may be treated as $2^{nd}$ circle friends, or group members may specify which circle they belong to). Subsequently, processing logic will consider their ratings in these categories while calculating weighted average. Alternatively, the user may specify whether these ratings should be considered or not. For example, the user may request that only ratings of close friends be considered.

Calculation of similarity between users will now be discussed in more details. In one embodiment, similarity between two users is defined using a correlation coefficient between the ratings of these two users in the same category. Although various correlation coefficients may be used as a measure of similarity, an exemplary correlation coefficient known as the product moment coefficient of correlation or Pearson's correlation will be used to illustrate how an embodiment of the present invention operates.

If we assume that n ratings $\{x\}$ are made by user A and n ratings $\{y\}$ are made by user B, so that each pair of ratings $(x_i, y_i)$ points to the same item, then the correlation coefficient can be expressed as follows:

$$r = \frac{n\sum xy - \sum x \sum y}{\sqrt{[n\sum x^2 - (\sum x)^2][n\sum y^2 - (\sum y)^2]}} \quad (12)$$

Then, rating r will be in a range from −1 to 1, where −1 means the rating patterns are absolutely not similar, 1 means perfect correlation, and 0 means that they are independent.

Formula (12) will now be illustrated using exemplary 10 ratings of users A and B in Tables 1 and 2.

TABLE 1

|  | User A X | User B Y |
| --- | --- | --- |
| Movie 1 | 1 | 2 |
| Movie 2 | 2 | 3 |
| Movie 3 | 8 | 8 |
| Movie 4 | 5 | 7 |
| Movie 5 | 5 | 6 |
| Movie 6 | 6 | 6 |
| Movie 7 | 7 | 4 |
| Movie 8 | 4 | 3 |
| Movie 9 | 9 | 8 |
| Movie 10 | 0 | 1 |

The ratings in Table 1 provide an example of good correlation, resulting in R(A,B)=0,874498.

TABLE 2

|  | User A X | User B Y |
| --- | --- | --- |
| Movie 1 | 1 | 8 |
| Movie 2 | 2 | 7 |
| Movie 3 | 8 | 2 |
| Movie 4 | 5 | 9 |
| Movie 5 | 5 | 2 |
| Movie 6 | 6 | 1 |
| Movie 7 | 7 | 2 |
| Movie 8 | 4 | 8 |
| Movie 9 | 9 | 1 |
| Movie 10 | 1 | 8 |

The ratings in Table 2 provide an example of poor correlation, resulting in R(A,B)=−0,78662.

In one embodiment, formula (12) is only used for overlapped ratings and for standard deviations of $\{x\}$ (DX) and $\{y\}$ (DY) that are non-zero (not if all $\{x\}$ or all $\{y\}$ are the same). In addition, formula (12) may not provide adequate results in case of low (ay less then 1) standard deviations (when rating values are in the range from 1 to 10). In the examples shown in Tables 1 and 2 the deviation is between 2 and 3. Table 3 illustrates a case with lower deviation.

TABLE 3

| 10 | User A X | User B Y |
| --- | --- | --- |
| Movie 1 | 6 | 8 |
| Movie 2 | 6 | 8 |
| Movie 3 | 5 | 8 |
| Movie 4 | 6 | 7 |
| Movie 5 | 6 | 8 |
| Movie 6 | 6 | 8 |
| Movie 7 | 6 | 8 |
| Movie 8 | 6 | 8 |
| Movie 9 | 6 | 8 |
| Movie 10 | 6 | 8 |

For ratings in Table 3, correlation factor R(A,B)=–0, 11111, and both standard deviations D(A), D(B) are =0.3. The ratings in Table 3 also show a similarity in the rating pattern—both users are very indiscriminate in their tastes. In one embodiment, when both standard deviations are less then 1, the two users are considered similar.

In one embodiment, the total number of user ratings and the number of overlapping ratings are considered to achieve a more accurate result. In addition, only users having N_MIN ratings in specific category are to be checked and only those user pairs (A, B) that have at least M_MIN (M_MIN<N_MIN) common items rated are mutually checked. Next, a correction coefficient RC(A, B) which depends on M(A,B) is introduced. Finally, the similarity coefficient SCCA, B) will depend on a correlation factor R(A, B) which is calculated over overlapped ratings, standard deviations D(A), D(B) and correction coefficient RC(A, B) as follows:

---

IF N(A)>=N_MIN AND N(A)>=N_MIN AND M(A<B)>=M_MIN THEN(
   1. If D(A)<DMIN AND D(B)<DMIN, then SC=1
   2. If D(A)>=DMIN, AND D(B)>=DMIN, then SC=R(A,B)*RC(A, B)
   3. Otherwise SC=0
)
OTHERWISE SC=0.

---

In the above algorithm, DMIN is a minimal threshold standard deviation. For ratings (1 . . . 10), we suggest DMIN=1. RC(A, B) varies from 0 (if ratings do not overlap) till 1 (if multiple ratings overlap). For example, the following formula may be used:

$$RC(A,B)=1-1/(1+M(A,B)) \quad (13)$$

Figure 21:
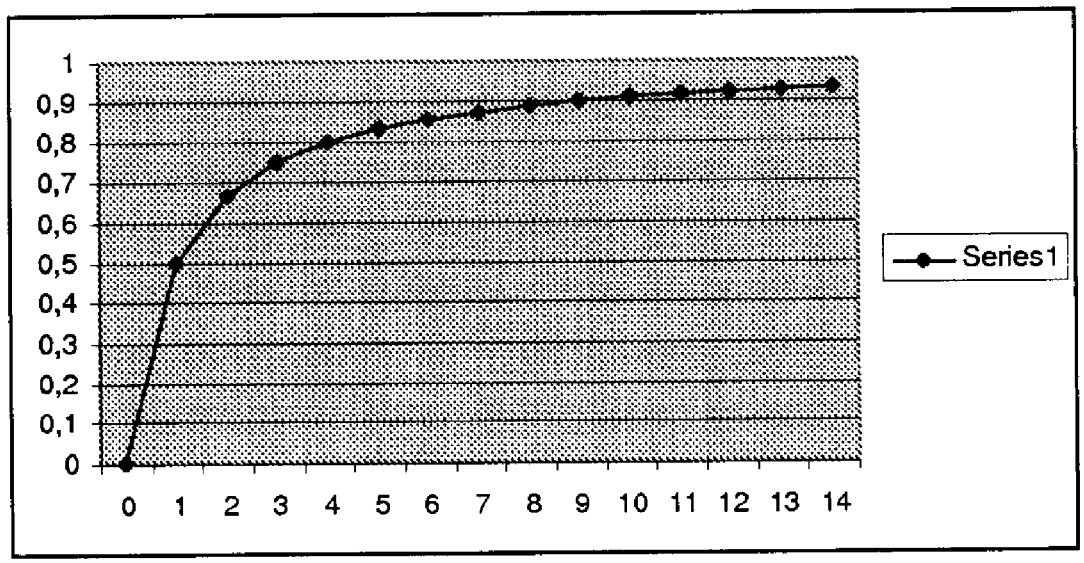
FIG. 21 is an exemplary diagram illustrating the behavior of an algorithm for calculating a correction coefficient in accordance with one embodiment.

FIG. 21 is an exemplary diagram illustrating the behavior of an algorithm for calculating a correction coefficient in accordance with one embodiment. The algorithm utilizes formula (13).

In one embodiment, prior to calculating the correlation between the users, the number of users qualified for similarity check is optimized. In particular, only users having N ratings in a specific category are to be checked and only those user pairs (A, B) that have at least M (M<N) common items rated are to be mutually checked. For example, for movies users may have to rate at least 10 movies, and a correlation between users A, B may be calculated if they rated at least 5 common movies. If similarity coefficient (SC) for users satisfying the above requirements is greater than 0.5, then such users are considered similar.

In one embodiment, if the users are similar, but not directly connected, these users may be proactively offered to connect directly, referring to their similarity in ratings and a common friend. Alternatively, these users may be asked to provide any other level of trust they would like to assign to each other.

In another embodiment, a similarity coefficient (SC) alone or in combination with trust level coefficient W(d) is taken into account as an additional weight.

Figure 9:
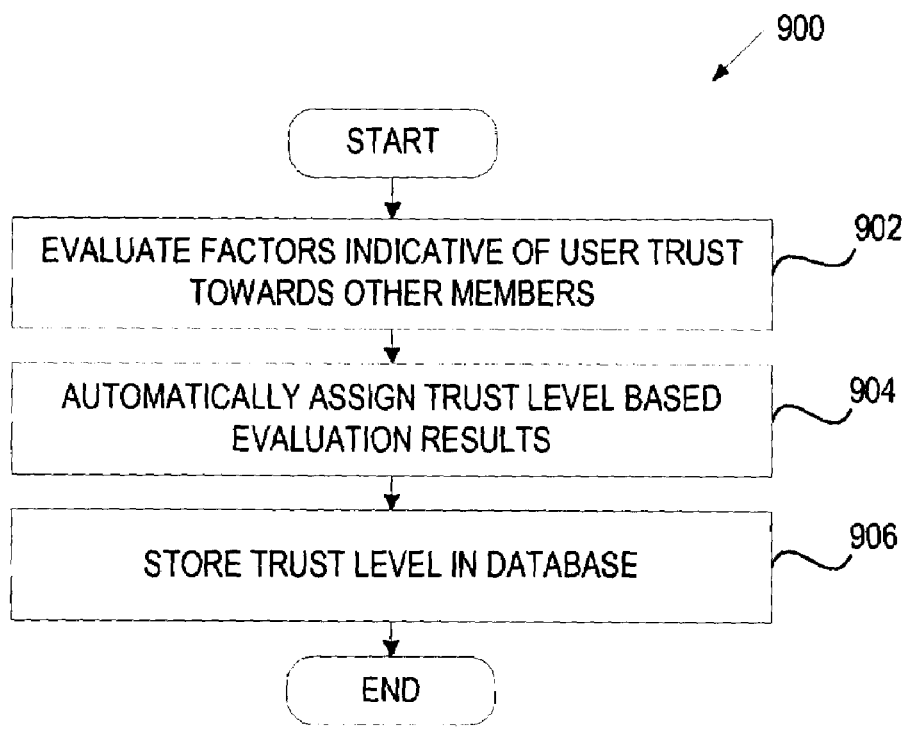
FIG. 9 is a flow diagram of one embodiment of a process automatically determining the level of trust of a user towards other members.

FIG. 9 is a flow diagram of one embodiment of a process 900 for automatically determining the level of trust of a user towards other members. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 900 is performed by a recommendation system 300 of FIG. 3.

Referring to FIG. 9, process 900 begins with processing logic evaluating factors indicative of user trust to other members (block 902). These factors may include, for example, user communications with other members, profiles of the user and other members, behavioral patterns of the user and other members, different combinations of the above factors, etc. The user communications may be email communications, IM communications, online chats or forum communications, sent greeting cards, VoIP communications, video calls, mobile phone communications, etc. Processing logic may evaluate user communications with a specific member based on frequency and type (nature) of these communications. For example, processing logic may distinguish between communications exchanged during work hours and weekend and after-work communications. In addition, processing logic may identify communications including birthday wishes or other friendship indicators. Behavioral patterns may be evaluated by identifying members that visited the same sites as this user, purchased the same products as this user, responded similarly to online surveys, etc.

Various systems may be used when obtaining data to perform the above evaluations. Exemplary systems may include Gmail®, Yahoo!® Mail, Yahoo!® Messenger and Yahoo!® 360 combination, ICQ®, Hotmail®, MSN® Spaces and MSN® Messenger, Skype®, Google® Talk, etc.

At block 904, processing logic automatically assigns the trust level to a specific member based on the evaluation results.

At block 906, processing logic stores the trust level in a user profile database.

FIGS. 10A-10F show exemplary user interfaces (UIs) illustrating a registration process according to some embodiments of the present invention.

Figure 10A:
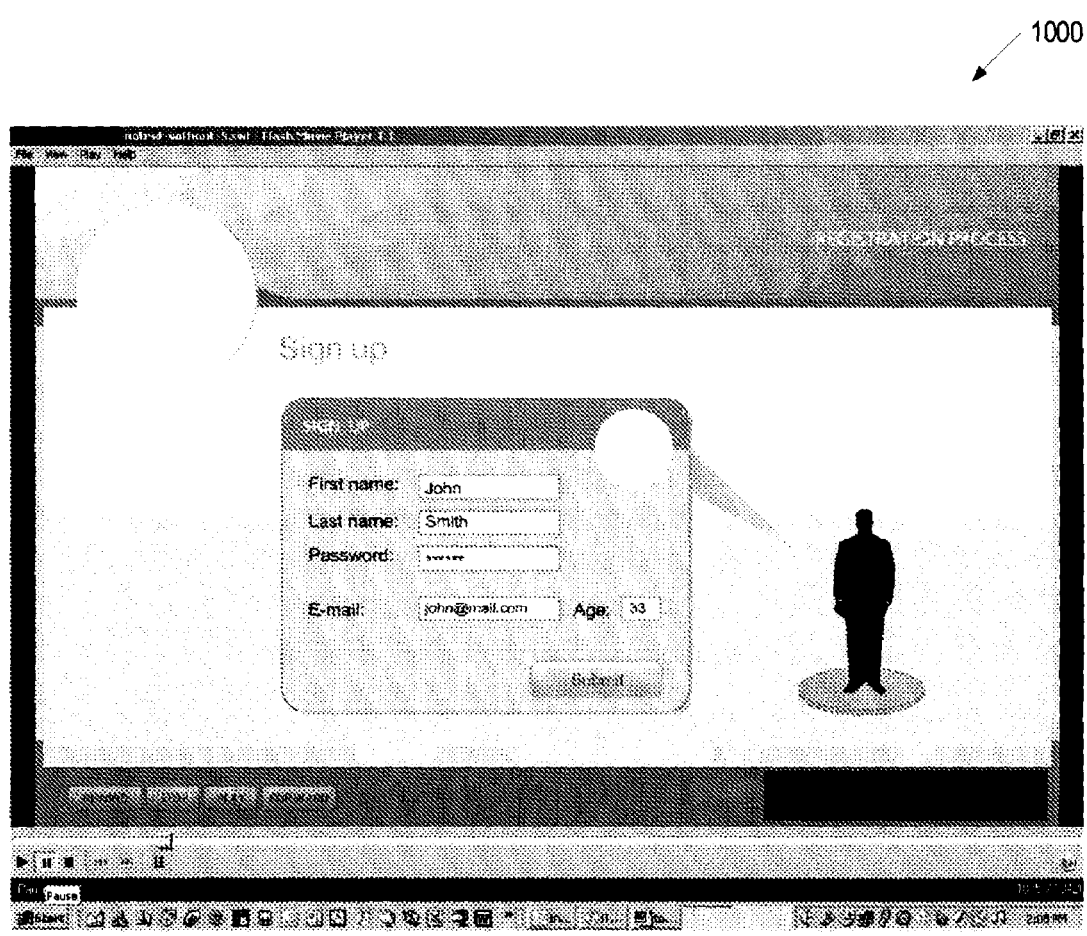
FIGS. 10A-10F show exemplary user interfaces illustrating a registration process according to some embodiments of the present invention.

Referring to FIG. 10A, UI 1000 shows exemplary data that a user needs to provide to register with the recommendation system.

Figure 10B:
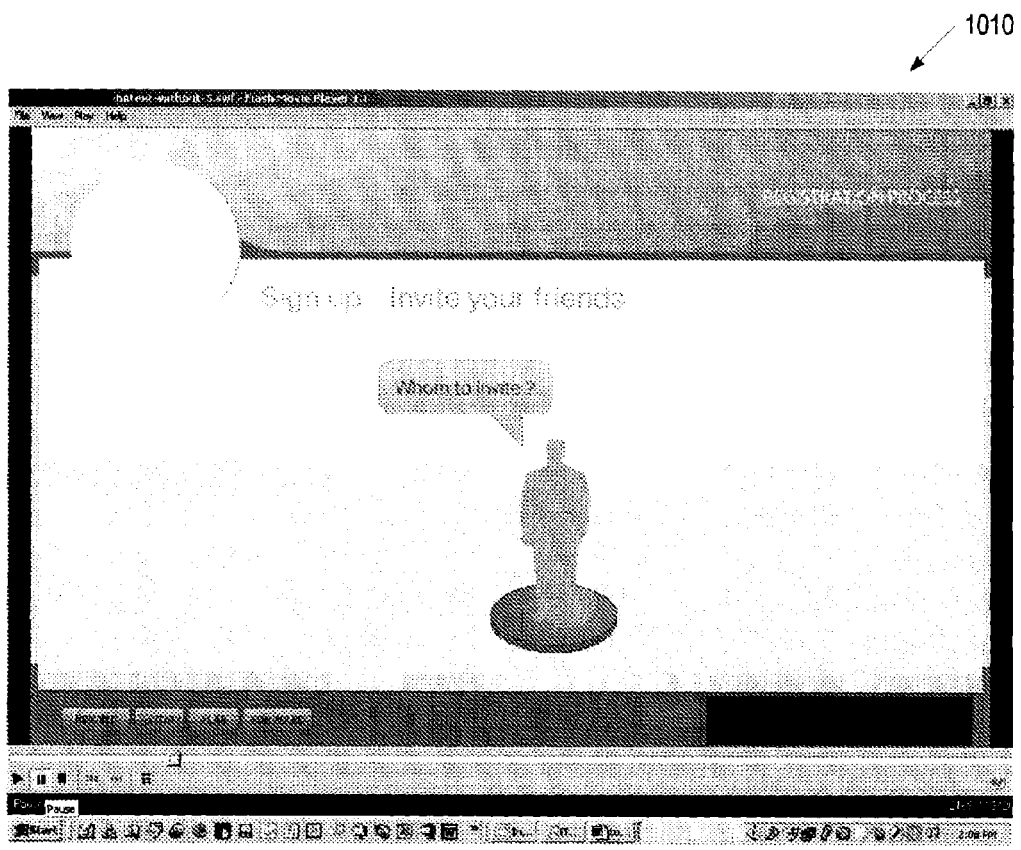

Referring to FIG. 10B, UI 1010 allows the user to invite friends to join the recommendation system.

Figure 10C:
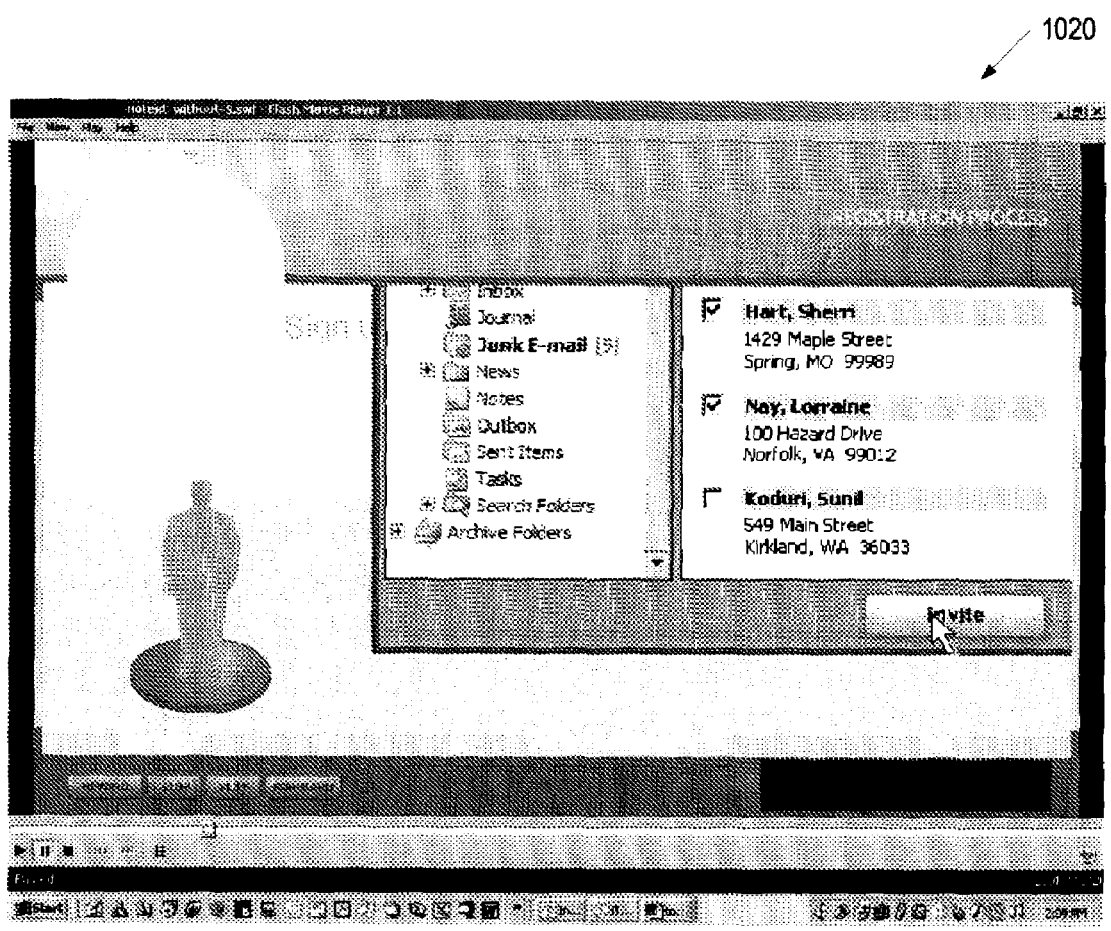

Referring to FIG. 10C, UI 1020 allows the user to select, from his or her address book, contacts that should be invited to join the recommendation system. Upon receiving the user selection, the recommendation system sends invitations to the selected individuals.

Figure 10D:
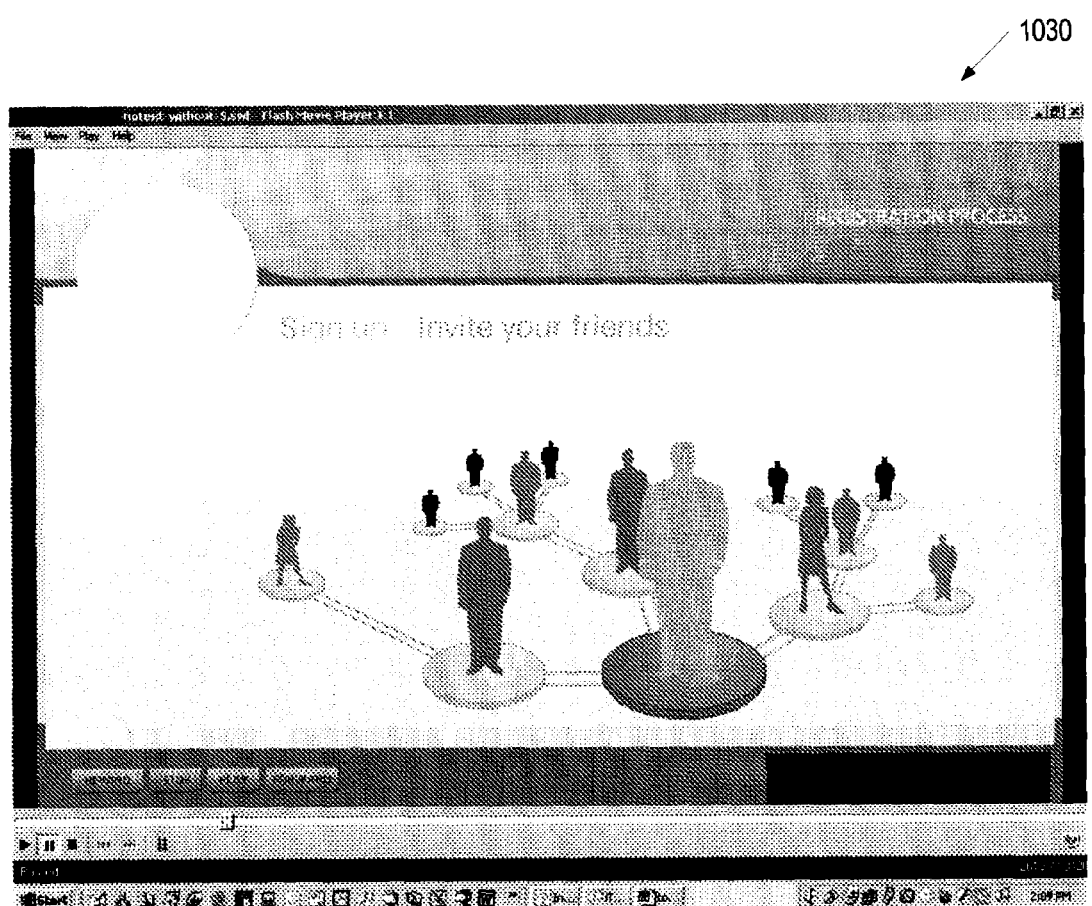

Referring to FIG. 10D, UI 1030 provides a visual representation of user relationships with other members.

Figure 10E:
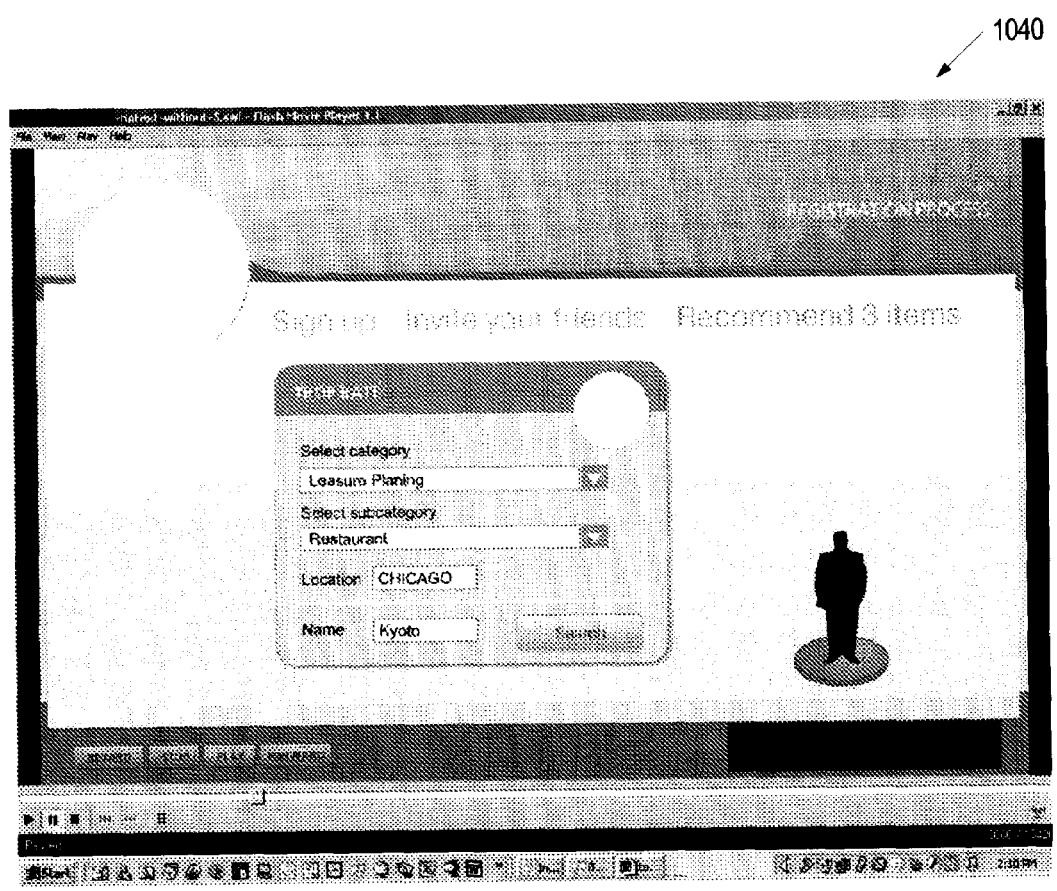

Referring to FIG. 10E, UI 1040 requests the user to provide 3 recommendations by selecting a category, a sub-category and specifying other parameters specific to this sub-category (e.g., location and name).

Figure 10F:
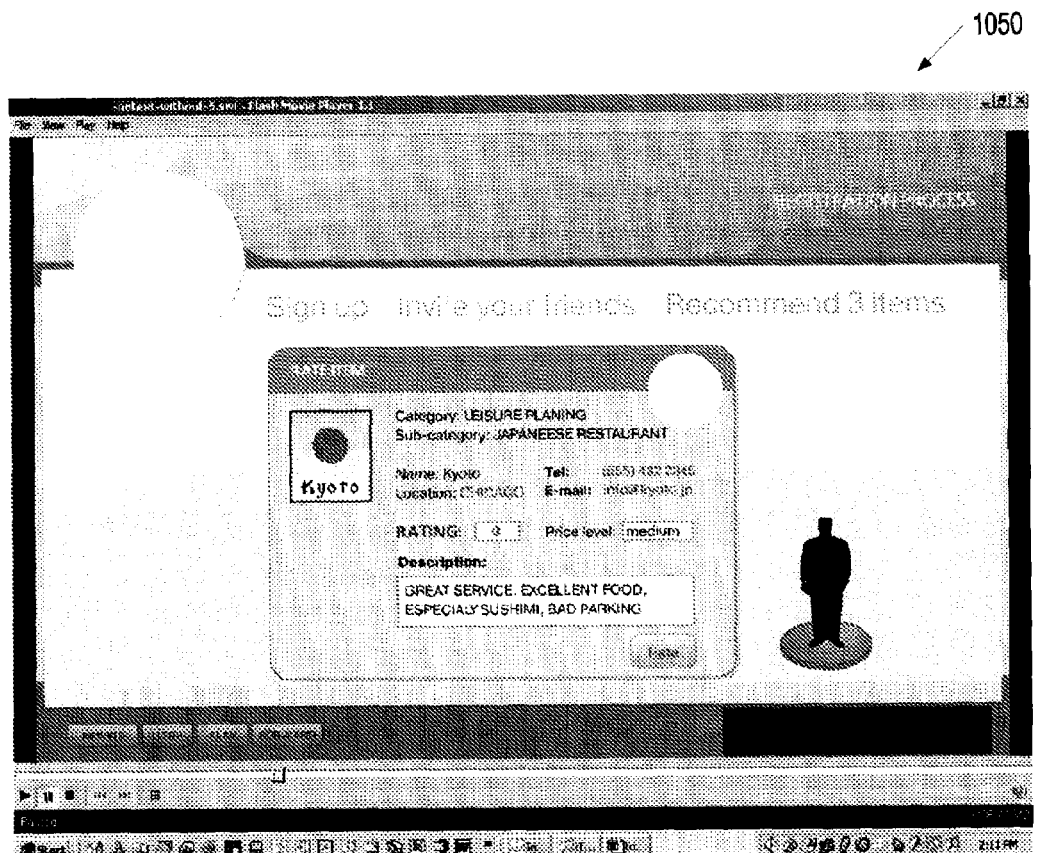

Referring to FIG. 10F, UI 1050 allows the user to provide rating, price level, and description for the selected item.

FIGS. 11A-11D show exemplary user interfaces (UIs) illustrating a process of providing customized recommendations to a user, according to some embodiments of the present invention.

Figure 11A:
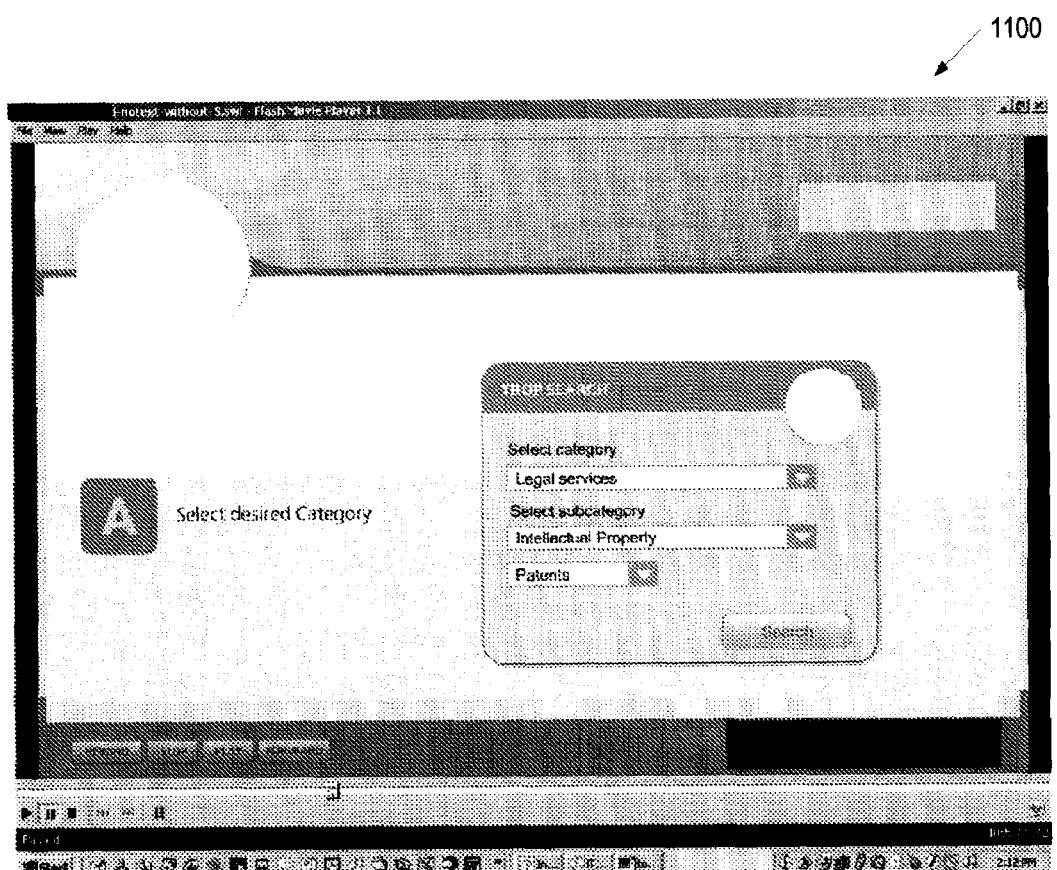
FIGS. 11A-11D show exemplary user interfaces illustrating a process of providing customized recommendations to a user, according to some embodiments of the present invention.

Referring to FIG. 11A, UI 1100 allows a user to select a desired category and sub-category.

Figure 11B:
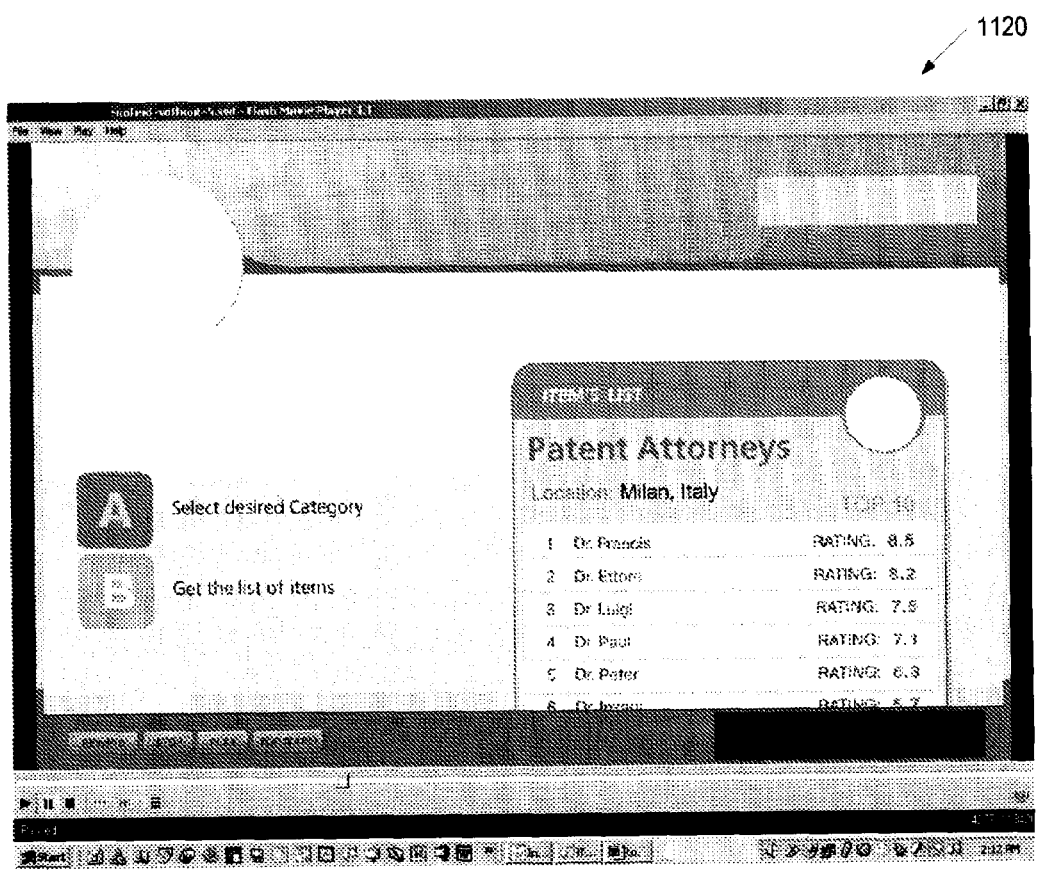

Referring to FIG. 11B, UI 1120 displays a list of items recommended to the user for the selected category, with corresponding ratings correlated to reflect the relevance of the recommendations to the user.

Figure 11C:
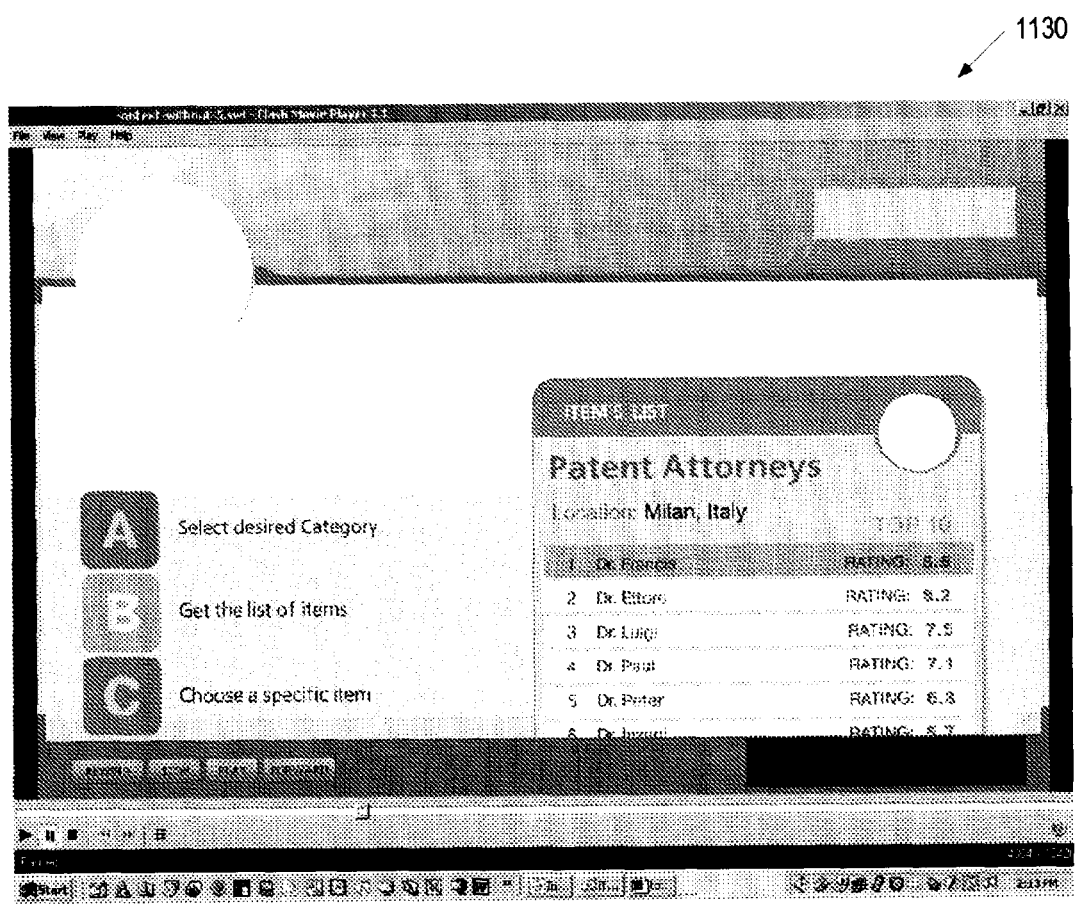

Referring to FIG. 11C, UI 1130 allows the user to select a specific recommended item from the list.

Figure 11D:
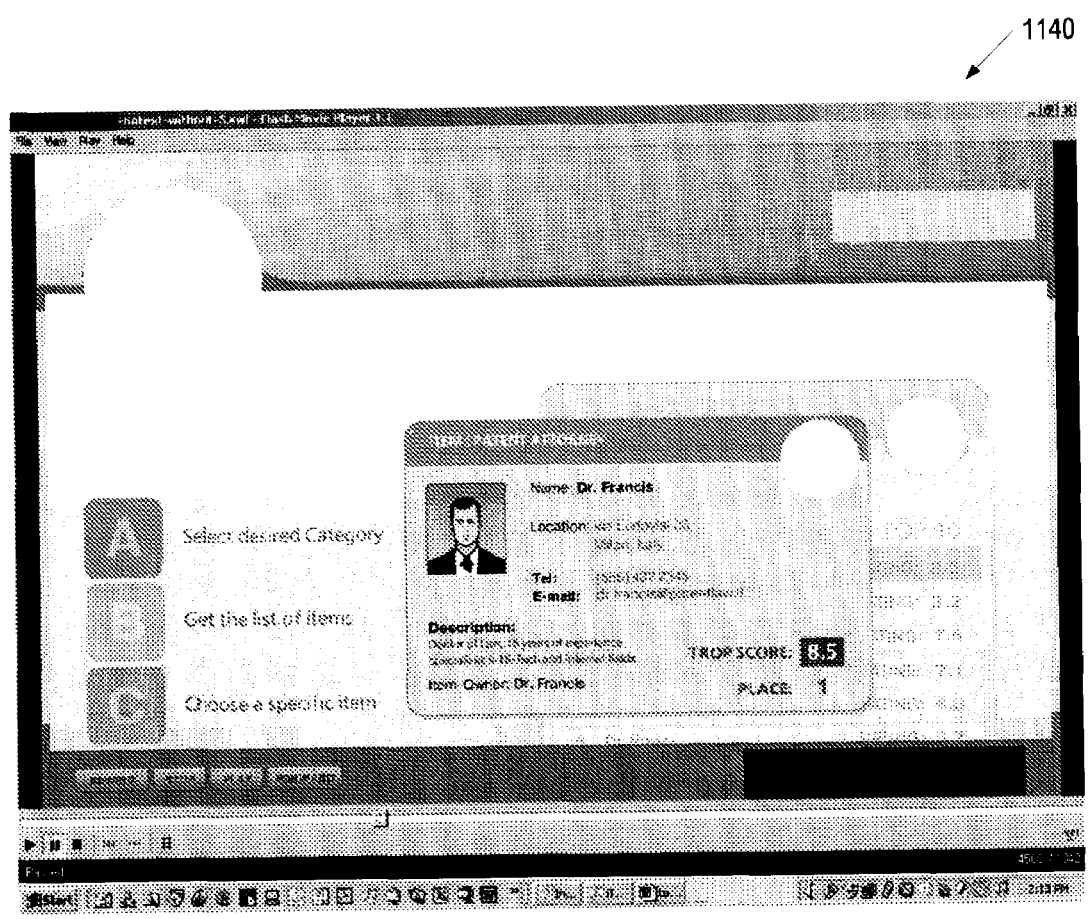

Referring to FIG. 11D, UI 1140 displays details about the selected item.

FIGS. 12A-D show exemplary user interfaces (UIs) graphically illustrating the relevance of ratings given by a plurality of users to a correlated rating or relevance for an information recipient.

Figure 12A:
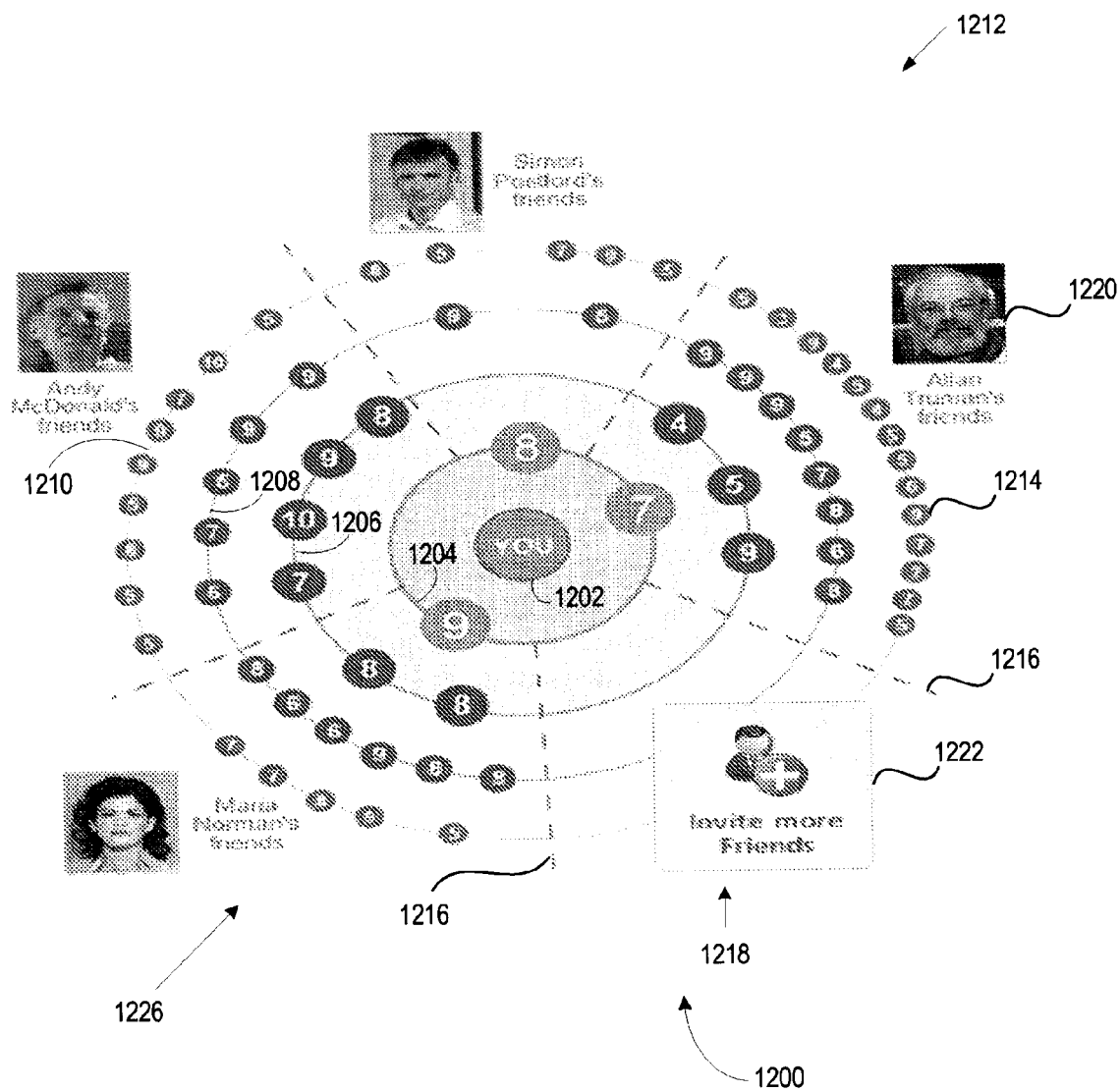

Referring to FIG. 12A, UI 1200 provides a visual representation of ratings for an item, wherein the visual representation illustrates the relevance of each of the ratings to the information recipient.

UI 1200 is shown including a first ring 1202, surrounded by concentric second, third, fourth and fifth rings 1204, 1206, 1208 and 1210, respectively, each of increasingly larger diameters.

In one embodiment, the relevance is defined by a level of trust, and the rings 1204-1210 correspond to different levels of trust. In particular, the first ring 1202 corresponds to the information recipient, and the rings 1204-1210 correspond to first, second, third and fourth levels of trust, respectively.

Alternatively, the relevance may be defined by a user level of expertise. In one embodiment, the user level of expertise conforms to the information recipient's evaluation of user expertise. The rings 1204-1210 may then correspond to levels of expertise (e.g., amateur, pro, expert). In other embodiments, rings 1204-1210 correspond to other relevance factors, such as, for example, time, similarity, etc.

Each of the rings 1204-1210 include a number of symbols 1212 thereon. Each of the symbols 1212 corresponds to a user. The symbols 1212 are illustrated as circles. However, any symbol may be used, such as, for example, a square, oval, star, triangle and the like.

Each of the symbols 1212 may include an alphanumeric character 1214 therein. The alphanumeric character 1214 may correspond to a rating given by the user. The rating may be a correlated rating, calculated based on relevance factors, such as, for example, an expertise level, similarity, a timestamp, and the like. Alternatively, the rating may be an actual rating provided by the user.

Alternatively, the alphanumeric character 1214 may correspond to relevance factors, such as, for example, an expertise level, similarity, a trust level, a time stamp and the like. The color or size of the symbol may correspond to the rating or the relevance factors. For example, the symbol 1212 may be green if the rating is positive, yellow if the rating is neutral and red if the rating is negative. In another example, the size of the symbol 1212 may be large if the user is an expert, medium if the user is a pro, and small if the user is an amateur.

In some embodiments, symbols 1212 may include, in addition to or as an alternative to the alphanumeric character 1214, another graphical symbol within the symbols 1212 to define a relevance factor. In one embodiment, the graphical symbol may be, for example, a square, oval, star, triangle and the like. The relevance factors may be, for example, an expertise level, similarity, a trust level, a time stamp and the like.

Dividing lines 1216 divide the rings 1204-1210 into wedges 1218. The wedges 1218 group users who are related to one another. For example, if the rings 1204-1210 correspond to levels of trust, each wedge 1218 corresponds to a group of users that includes a specific user in the first level of trust and users related to this specific user who are associated with other levels of trust.

In one embodiment, photographs 1220 of the users in the first level of trust are provided near the wedges 1218. The photographs 1220 allow the information recipient to understand that the wedges 1218 group the users according to their relationship with the person in the photograph 1220. A selectable graphic 1222 may also be provided near one of the wedges 1218, such that the information recipient can invite more users to rate the item and/or join the recommendation system.

For example, wedge 1226 may represent a group for Maria. This group includes Maria whose rating is shown at ring 1204, associated with the first level of trust, and Maria's friends (and/or friends of Mari's friends) whose ratings are shown at rings 1206-1210 that correspond to second, third and fourth levels of trust, respectively.

It will be appreciated that the users may be otherwise grouped (e.g., without using the dividing lines 1216 and/or wedges) to show the relationship among the users. It will also be appreciated that the users may be grouped according to relevance factors other than the level of trust.

Figure 12B:
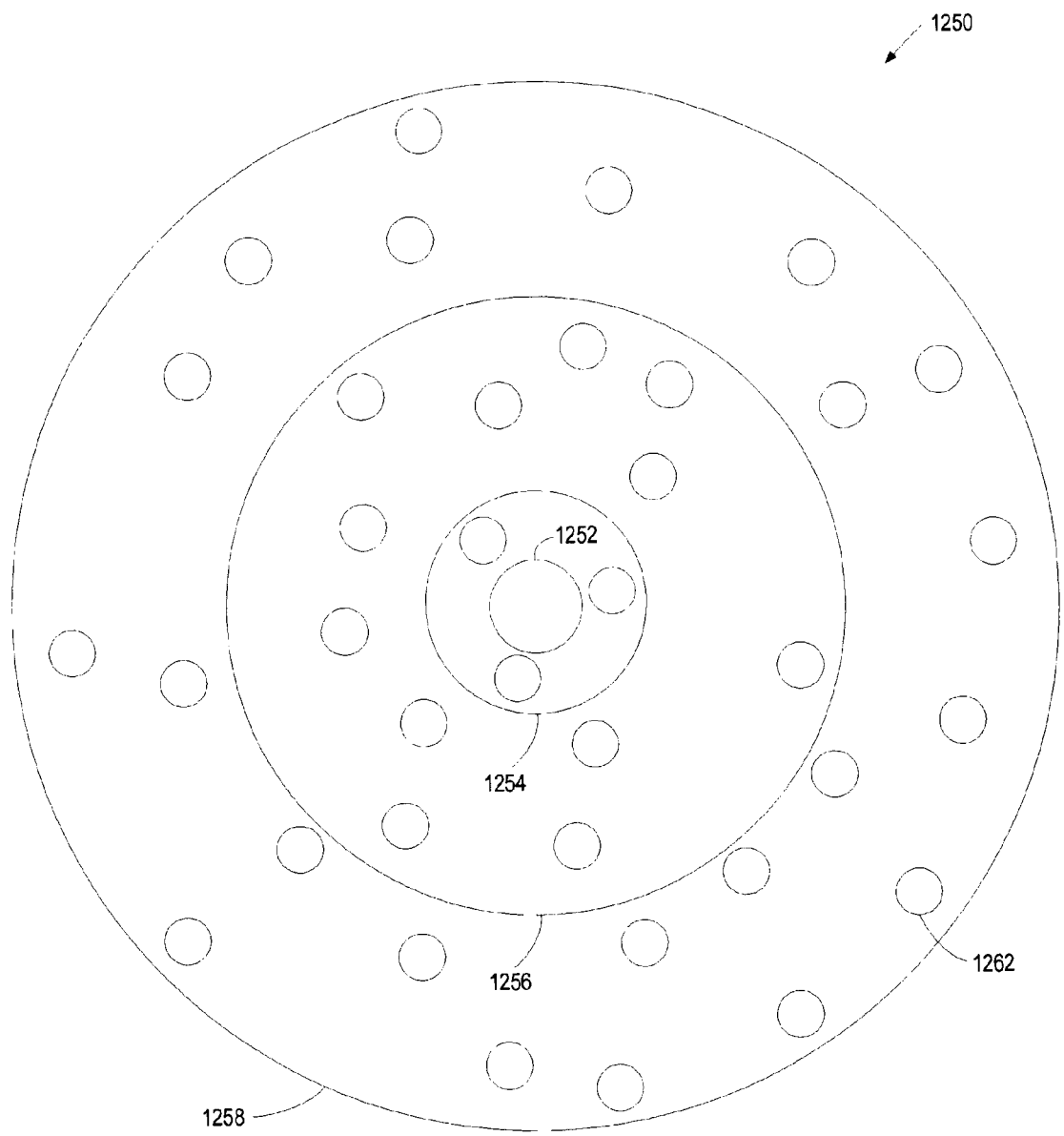

Referring to FIG. 12B, UI 1250 provides a visual representation of ratings, wherein the visual representation illustrates the relevance of the ratings to the information recipient.

In one embodiment, the relevance is defined by one or more coefficients. As discussed hereinabove, the coefficients typically include, but are not limited to, a trust level coefficient, an expertise coefficient, a timing coefficient, a similarity coefficient, a ratings number coefficient, and the like. The coefficients may produce a range of values.

UI 1250 includes a first ring 1252, surrounded by concentric second, third and fourth rings 1254, 1256 and 1258, respectively, each of increasingly larger diameters. In one embodiment, the relevance may be defined by levels of trust, and the rings 1254-1258 correspond to different levels of trust. In particular, the first ring 1252 may correspond to the information recipient, and the rings 1254-1258 may correspond to first, second and third levels of trust, respectively. Alternatively, the relevance may be defined by levels of expertise, and the rings 1254-1258 may then correspond to the levels of expertise.

Each of the rings 1254-1258 include a number of symbols 1262 therein. Each of the symbols 1262 corresponds to a user. The symbols may have different parameters, such as, shape, size, color, etc. The parameters may define relevance (e.g., a larger symbol means the user is more relevant than a smaller symbol, etc.). Alternatively, the parameters may represent the nature of the rating (e.g., green for a positive rating and red for a negative rating, etc.). In yet another embodiment, the parameters may not have any meaning. The symbols 1262 may include an alphanumeric character used to define an actual or correlated rating or a relevance factor, such as, for example, a trust level, an expertise level, similarity, a timestamp and the like.

The location of the symbols 1262 may be determined by one or more of the above coefficients. In one embodiment, if the rings 1254-1258 represent levels of trust, the trust level coefficient is used to determine the location of the symbol 1262. The trust level coefficient may calculate a level of trust that is a range of values (i.e., not necessarily integer values). For example, in one embodiment, the rings 1254-1258 correspond to an integer value of trust (e.g., 1 for a first level of trust, 2 for a second level of trust, and so on). Thus, users having a calculated trust value of 1-2 (e.g., a trust value of 1.5) would then correspond to a symbol 1262 located midway between ring 1256 and ring 1258.

Figure 12C:
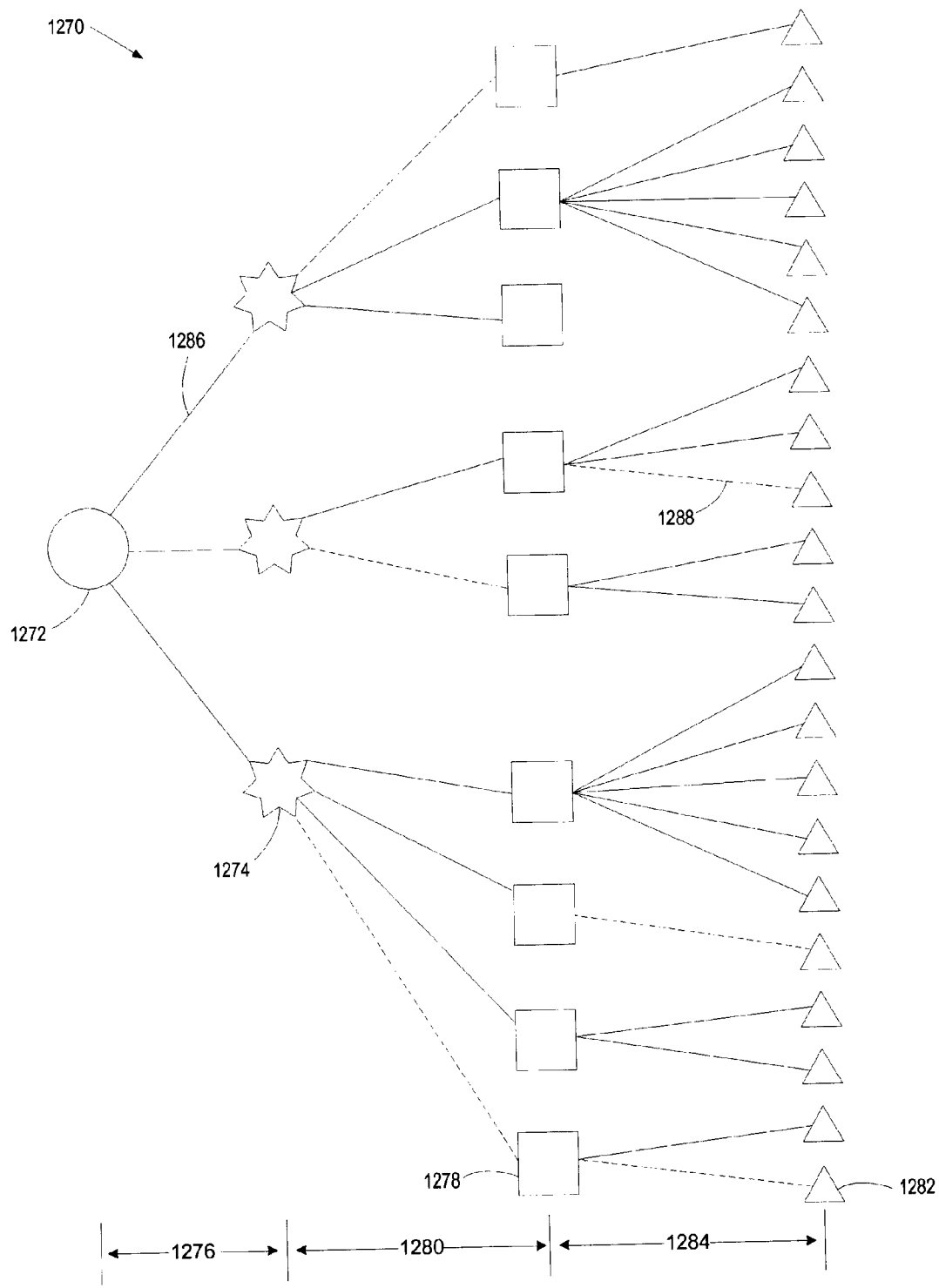

Referring to FIG. 12C, UI 1270 provides a visual representation of ratings, using symbols that illustrate the relevance of the ratings to the information recipient. In one embodiment, different shapes of symbols correspond to different degrees of relevance of ratings to the information recipient.

UI 1270 includes a circle 1272. UI 1270 also includes stars 1274. The stars 1274 are separated from the circle 1272 by a first distance 1276.

The UI 1270 also includes a plurality of squares 1278. The squares 1278 are separated from the stars 1274 by a second distance 1280. The UI 1270 also includes a plurality of triangles 1282. The plurality of triangles 1282 are separated from the squares 1278 by a third distance 1284.

The circle 1272 corresponds to the information recipient. Each of the stars 1274, squares 1278 and triangles 1282 corresponds to a user.

In one embodiment, wherein relevance is defined by a level of trust, the distances 1276, 1280 and 1284 may correspond to first, second and third levels of trust, respectively. Alternatively, in an embodiment wherein relevance is defined by expertise, the distances 1276, 1280 and 1284 may correspond to an expertise level.

Each of the circle 1272, stars 1274, squares 1278 and triangles 1282 may be connected to one another with solid connection lines 1286 or dashed connection lines 1288. The lines 1286 and 1288 allow the information recipient to visualize the relationship among each of the users. In one embodiment, the solid connection lines 1286 may be used if the user rated the item and the dashed connection lines 1288 may be used if the user did not rate the item.

Referring to FIG. 12D, UI 1290 provides a visual representation of ratings, using symbols that illustrate factors contributing to the ratings.

UI 1290 includes a list of user's names 1291 and a list of ratings 1292 provided by each of the users in the list of user's names 1291. The UI 1290 also includes a graphical illustration of the contributing factors 1293 for each rating in the list of ratings 1292. The contributing factors may include, for example, characteristics of the item and/or relevance factors. In one embodiment, a characteristic of the item includes a frequency of use of the item by the user. In one embodiment, the relevance factors include a trust level, expertise level, similarity, time, and the like.

The graphical illustration of the contributing factors 1293 includes a graphical element 1294 for each rating in the list of ratings 1292. In one embodiment, the graphical element 1294 is a gauge bar, as shown in FIG. 12D. The gauge bar has a first end 1295 and a second end 1296. The graphical element 1294 also includes a symbol 1297 located between the first end 1295 and the second end 1296 of the gauge bar.

In one embodiment, the location of the symbol 1297 relative to the first end 1295 and second end 1296 corresponds to the relevance of the rating. The location may correspond to, for example, a frequency of use of the item. For example, if the symbol 1297 is located closer to the first end 1295, the frequency of use of the item is low; if the symbol 1297 is located closer to the second end 1296, the frequency of use is high.

The symbols 1297 may have different parameters, such as, for example, a shape, size, texture, color, etc, as shown in FIG. 12D. Each of these parameters may define a contributing factor as well. Alternatively, the parameters may not have any meaning. That is, in one embodiment, the shape of the symbols 1297 may not define anything.

Thus, four exemplary UIs have been described. Each of the UIs is characterized in that they each provide a graphical illustration of the relevance of a plurality of ratings by a plurality of users to an information recipient. The ratings may be aggregated or non-aggregated (e.g., actual) ratings.

It will be appreciated that the UI need not be limited to the illustrated UIs (UI 1200, UI 1250, UI 1270, and 1290). It will also be appreciated that the ratings may be displayed using one or more of a symbol, alphanumeric character, color, shape, size and the like. Similarly, the relevance for each of the ratings may be graphically illustrated by one or more of a distance, size, shape, color and symbol, and the like. The relationship among the users may be graphically illustrated by one or more of a grouping of the users, a connection line between the users, size, shape, color, symbol, and the like.

It will be appreciated from the above description that an information recipient who views the UT can visually understand the relevance of each of the ratings provided for a particular item. In addition, the information recipient can visually understand the relationship of each user that provided a rating to the other users and/or the relationship between the information recipient and the other users. Thus, the UI may enable an information recipient to understand how an aggregated recommendation was made based on a plurality of ratings. The UI may also enable the information recipient to make a decision about a rated item based on the plurality of ratings presented in the UI. Other factors affecting relevance, such as, for example, time, expertise, similarity and the like, can be provided to the information recipient in the UI as well.

Figure 13A:
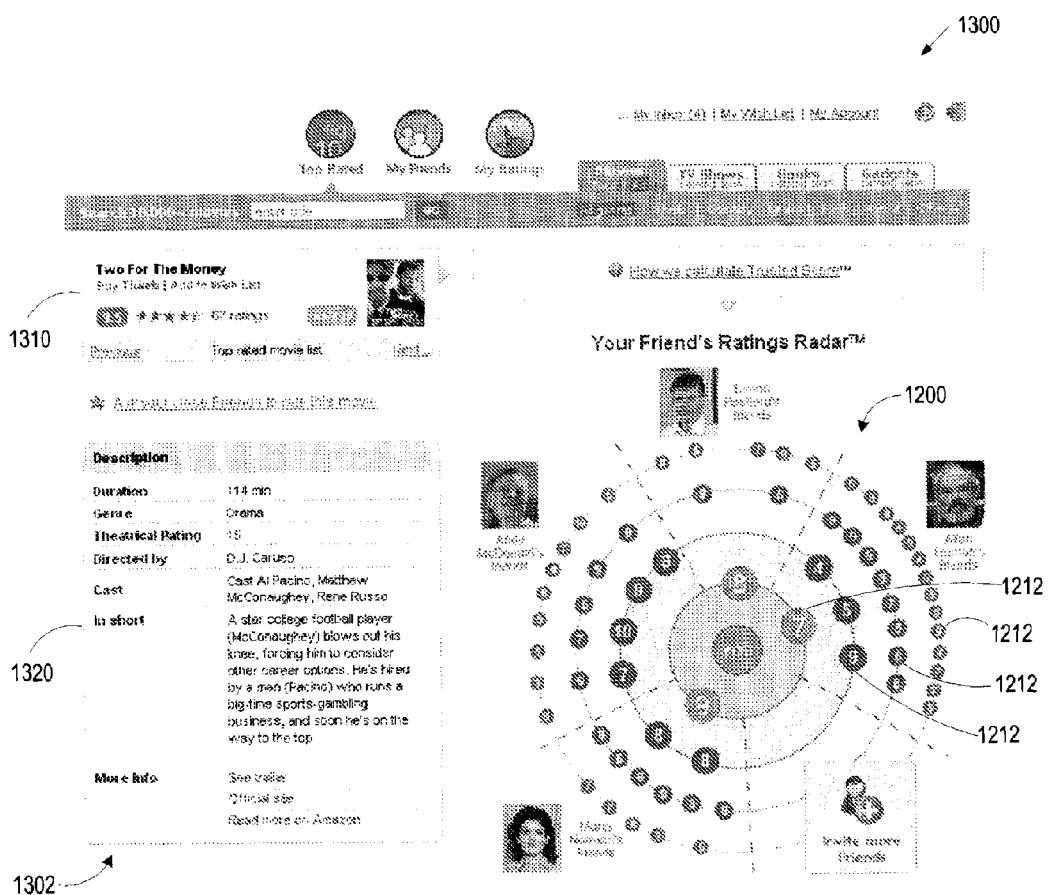
FIGS. 13A-13B show an exemplary webpage for displaying a user interface according to one embodiment of the present invention.
Figure 13B:
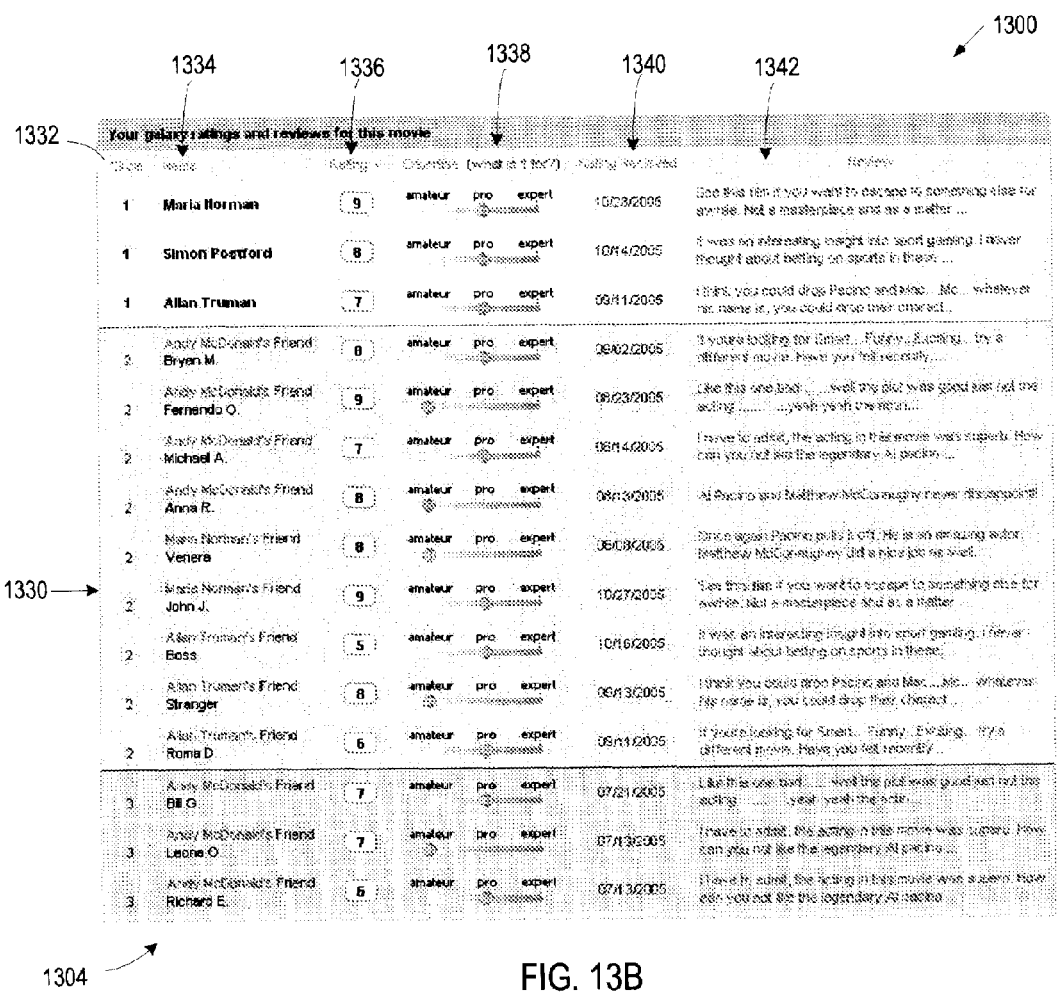

FIGS. 13A-B show a webpage 1300 incorporating a visual representation of ratings, such as, for example, the representation shown in UI 1200, according to one embodiment of the invention. The webpage 1300 may include a first screen 1302 (FIG. 13A) and a second screen 1304 (FIG. 13B). The first screen 1302 and the second screen 1304 may together form one page or may be separate pages.

UIs 1250, 1270 or 1290, or any other UI illustrating the relevance of the ratings to the information recipient, can be incorporated into the webpage 1300 instead of UI 1200. Although the UI is shown displayed on a webpage, the UI may be displayed in any other manner which allows a user of a system to view a plurality of ratings.

Referring to FIG. 13A, UI 1200 is shown displayed on the first screen 1302 of the webpage 1300. The UI 1200 can be displayed in any location on the webpage 1300.

The first screen 1302 may also include a summary section 1310 and a description section 1320. The summary section 1310 is shown providing a recommendation to the information recipient and a brief description of the rated item, and the description section 1320 provides some details about the rated item. However, it is also envisioned that the UI 1200 can be presented alone (i.e., without a summary section or a description section).

The second screen 1304 includes a table 1330. The table 1330 may show, for each user, a level of trust 1332, user name 1334, rating 1336, expertise level 1338, rating date (i.e., timestamp) 1340 and detailed review 1342.

The plurality of ratings in the UI 1200, represented by the plurality of symbols 1212, may be selectable to provide additional information about the ratings/or and the users. Selecting any one of the ratings, represented by symbols 1212, shown in FIG. 13A may direct or link the information recipient to the table 1330 shown in FIG. 13B. The table 1330 provides additional information about the user and/or the rating. Thus, the information recipient can get additional information, such as, for example, a user identity, detailed rating information, expertise level of the user, circle of trust level of the user, a rating by a user for a plurality of items, and the like.

Figure 14A:
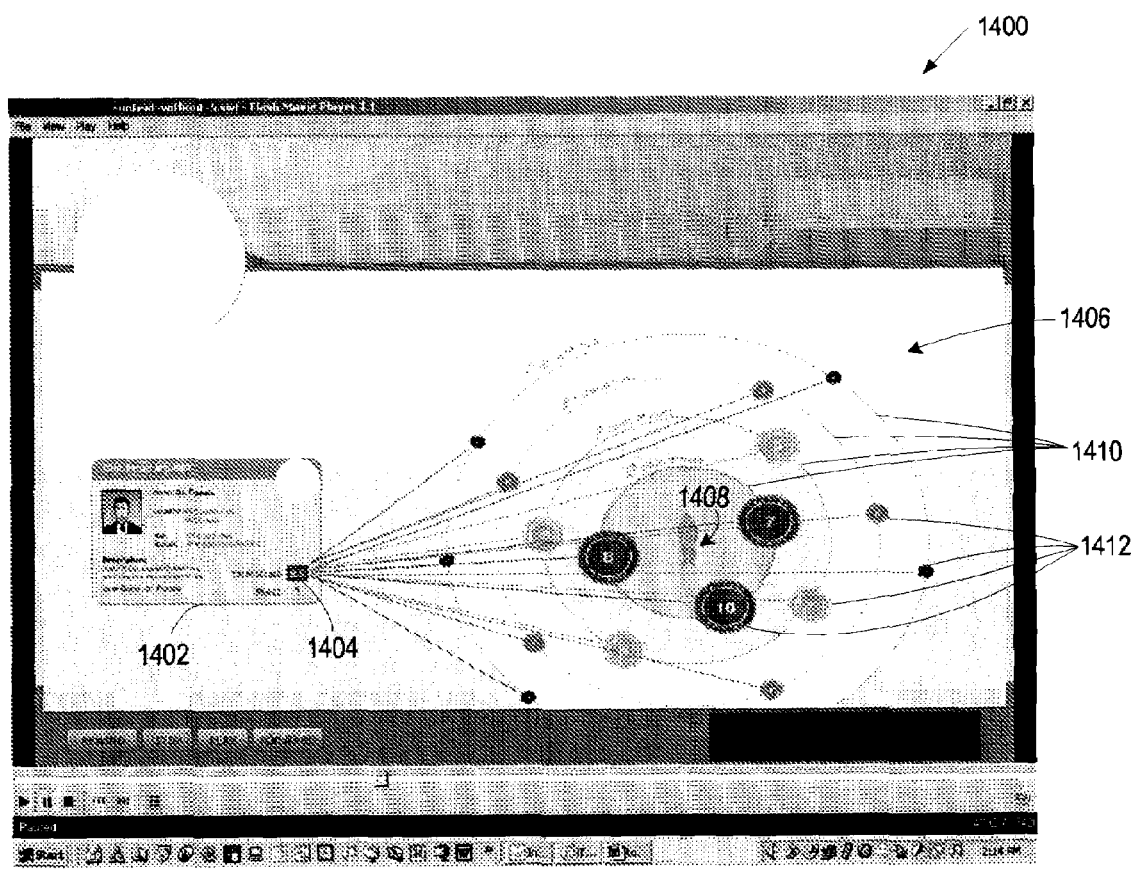
FIGS. 14A-14B show exemplary user interfaces illustrating a process of providing customized recommendations to a user and illustrating the relevance of a plurality of ratings used to arrive at the customized recommendations, according to some embodiments of the present invention.
Figure 14B:
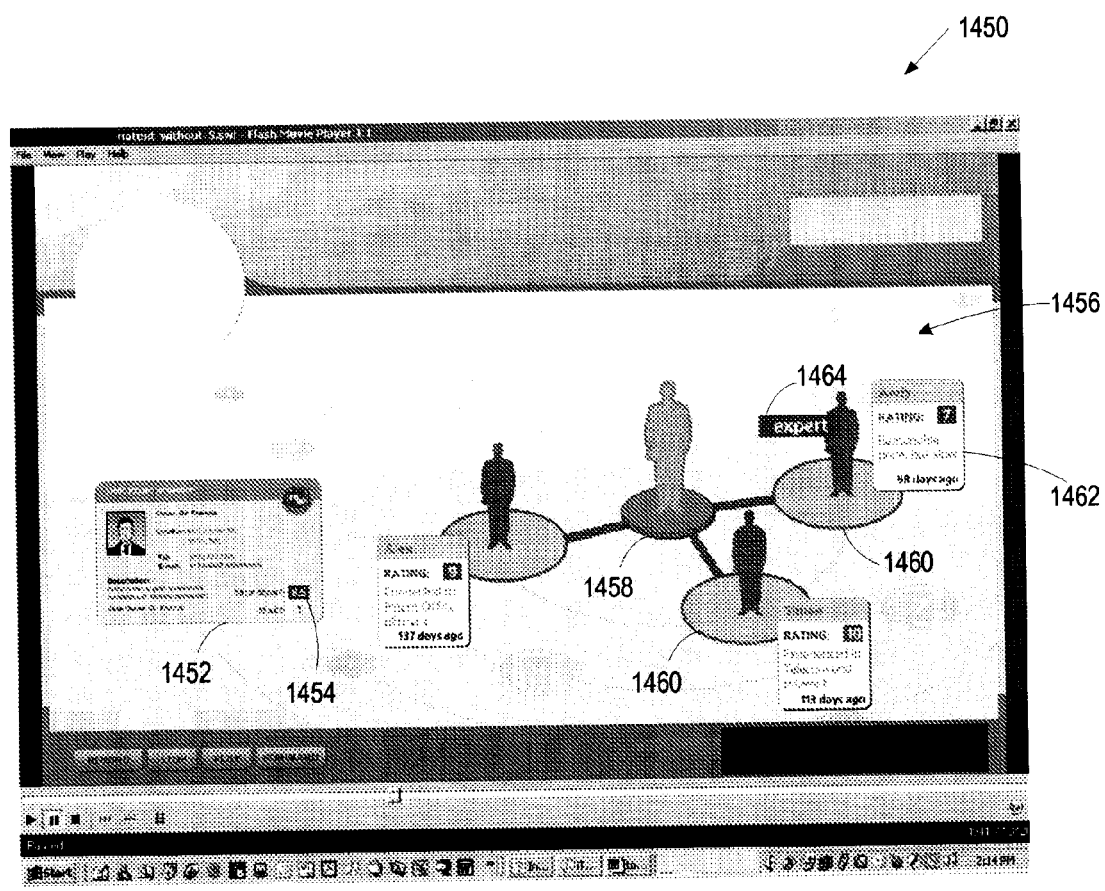

FIGS. 14A-B show exemplary user interfaces (UIs) graphically illustrating the relevance of ratings to an information recipient.

Referring to FIG. 14A, UI 1400 provides a visual representation of how ratings provided by different users for a specific item (e.g., an attorney) contributed to a resulting recommendation.

UI 1400 displays a business card 1402 for a recommended attorney. It will be appreciated that the business card 1402 need not be limited to recommended attorneys. The business card 1402 includes an aggregated recommendation value 1404, which is provided to the information recipient. UI 1400 also includes a ratings display 1406, which may be linked to the recommendation value 1404.

When the information recipient is presented with the business card 1402 including the recommendation value 1404, the information recipient may select the recommendation value 1404. Selecting the recommendation value 1404 may cause the visual display 1406 to be presented, graphically illustrating the relevance of ratings provided by the different users to the recommendation value 1404.

The visual display 1406 is shown having a centrally-located symbol 1408, which may correspond to the information recipient. The symbol 1408 is surrounded by concentric rings 1410, each of increasingly larger diameter. In an embodiment wherein the aggregated recommendation value is based on a level of trust, each of the rings 1410 corresponds to a level of trust. However, the rings 1410 may correspond to other relevance factors.

The visual display 1406 also includes a number of symbols 1412 on the rings 1410, corresponding to users whose rating contributed to the recommendation. The symbols 1412 are illustrated as being various sizes and colors, and each includes an alphanumeric character therein. As described above, the shape, size, color, alphanumeric character, etc. may correspond to a relevance factor, such as, for example, a rating, expertise level, trust level, timestamp, similarity and the like.

It will be appreciated that UIs 1200, 1250, 1270 or 1290, or other similar UIs, may be substituted for the visual display 1406.

Referring to FIG. 14B, UI 1450 displays factors associated with members at the first level of trust that provided ratings for the selected item.

UI 1450 includes a business card 1452 including an aggregated recommendation value 1454, which is provided to the information recipient. UI 1450 also includes a visual display 1456, which may be linked to the recommendation value 1454.

When the information recipient is presented with the business card 1452 including the recommendation value 1454, the information recipient may select the recommendation value 1454. Selecting the recommendation value 1454 may cause the visual display 1456 to be presented, graphically illustrating the relevance of ratings provided by the different users to the recommendation value 1454.

The visual display 1456 is shown having a centrally-located symbol 1458, which may correspond to the information recipient. The centrally-located symbol 1458 is surrounded by symbols 1460, corresponding to other members.

The visual display 1456 also includes a first textbox 1462 associated with the symbols 1460. The visual display 1456 also includes a second textbox 1464. The textboxes 1462 and 1464 may describe some of the factors associated with the members, such as, for example, a timestamp, an expertise level, and the like.

It will be appreciated that the textboxes described above may be incorporated into any other UI graphically illustrating relevance, including, for example, UIs 1200, 1250, 1270 and 1290.

Figure 15:
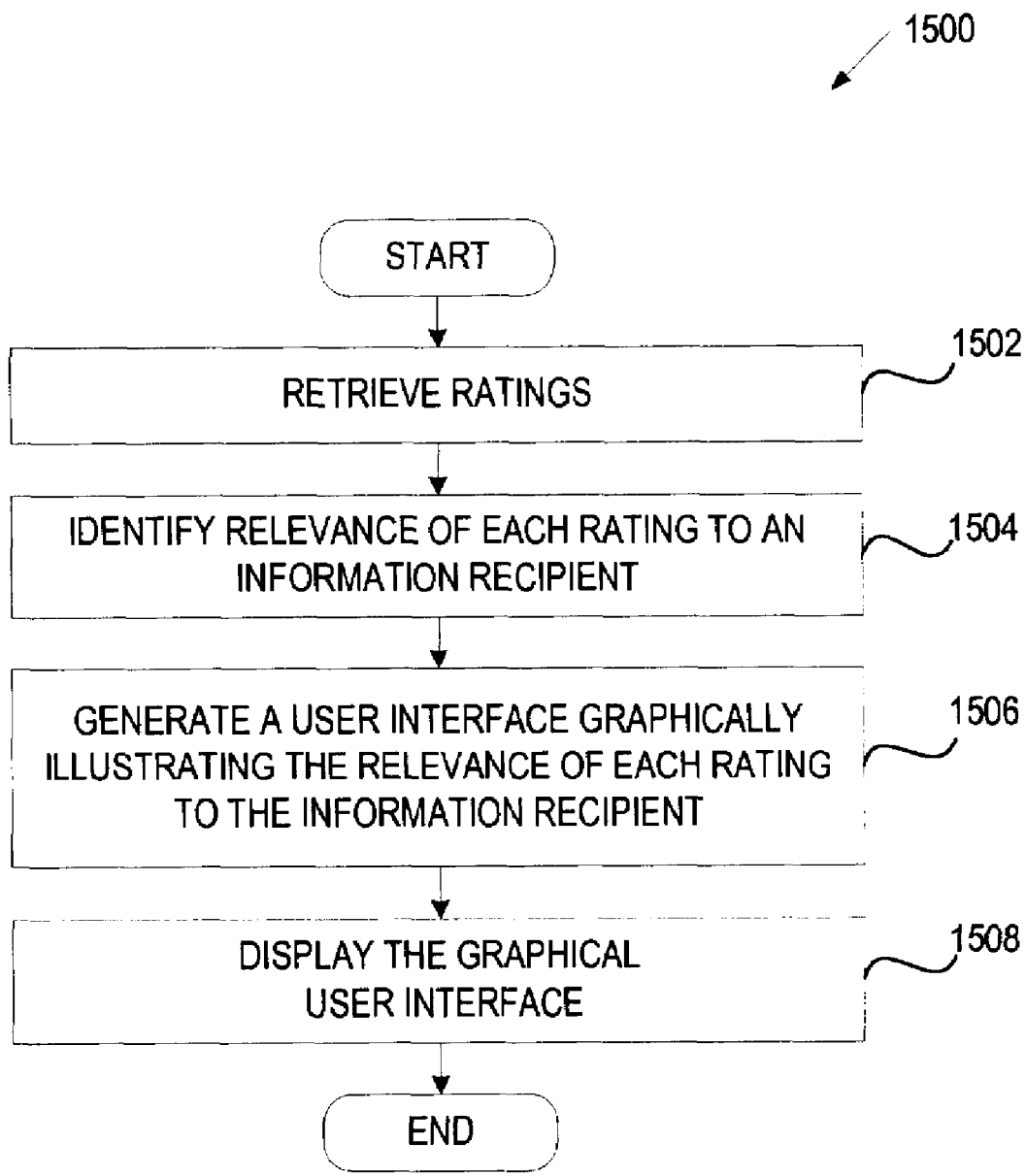
FIG. 15 is a flow diagram of one embodiment of a process for generating and displaying a user interface.

FIG. 15 shows a process 1500 for generating and displaying a user interface. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 1500 is performed by a recommendation system 300 of FIG. 3.

Referring to FIG. 15, the process 1500 begins with processing logic retrieving the plurality of ratings for the item from a database (1502).

At block 1504, processing logic identifies the relevance of each of the plurality of ratings to the information recipient. As discussed above, the relevance may be determined according to one or more factors, such as, for example, a trust level, expertise level, timing similarity, and the like.

At block 1506, processing logic generates a user interface, the user interface graphically illustrating the relevance of each of the plurality of ratings to the information recipient. As discussed above, the ratings and/or relevance may be illustrated using any one or more of symbols, alphanumeric characters, size, shape, color, distances, groupings, connection lines and the like.

At block 1508, processing logic displays the user interface to the information recipient.

Figure 16:
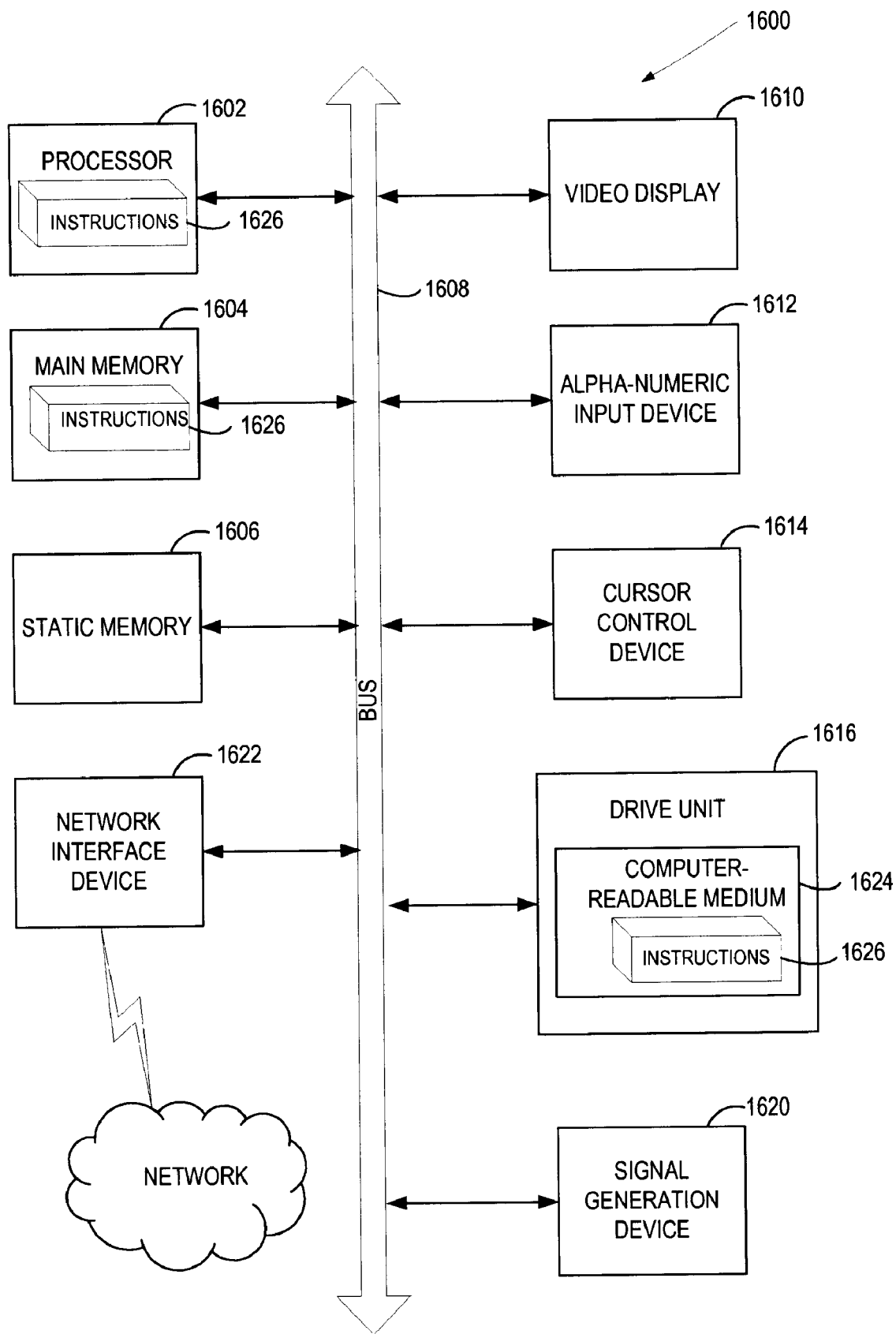
FIG. 16 is a block diagram of one embodiment of a computer system.

FIG. 16 shows a diagrammatic representation of machine in the exemplary form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1600 includes a processor 1602 (e.g., a central processing unit (CPU), a graphics processing unit (GPU) or both), a main memory 1604 (e.g., read only memory (ROM), flash memory, dynamic random access memory (DRAM) such as synchronous DRAM (SDRAM) or Rambus DRAM (RDRAM), etc.) and a static memory 1606 (e.g., flash memory, static random access memory (SRAM), etc.), which communicate with each other via a bus 1608.

The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1620 (e.g., a speaker) and a network interface device 1622.

The disk drive unit 1616 includes a machine-readable medium 1624 on which is stored one or more sets of instructions (e.g., software 1626) embodying any one or more of the methodologies or functions described herein. The software 1626 may also reside, completely or at least partially, within the main memory 1604 and/or within the processor 1602 during execution thereof by the computer system 1600, the main memory 1504 and the processor 1602 also constituting machine-readable media.

The software 1626 may further be transmitted or received over a network 1628 via the network interface device 1622.

While the machine-readable medium 1624 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and apparatus for providing customized recommendations to users have been described. A method and apparatus for generating and displaying a user interface, graphically illustrating the relevance of a plurality of ratings to a particular user have also been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computerized method for providing customized recommendations to an information recipient, the method comprising:
    displaying, in a first view of a user interface, a plurality of ratings provided for an item by a plurality of users, wherein each rating represents an individual user's rating of the item, and each rating is placed on a shape having a particular size among a plurality of shapes having different sizes;
    displaying, in the first view of the user interface, an indication of a one-to-one correspondence between each rating of the plurality of ratings and a distinct one of the plurality of users; and
    displaying, in the first view of the user interface, a plurality of relevance indicators, wherein each relevance indicator indicates a level of trust by the information recipient toward a corresponding individual user providing a rating of the plurality of ratings, and wherein each relevance indicator is a visual indicator that graphically illustrates a relevance of each rating of the plurality of ratings to the information recipient using a distance between a point corresponding to the information recipient and each of the plurality of shapes having different size.

2. The method of claim 1 further comprising:
    displaying an aggregated recommendation, the aggregated recommendation determined based on the plurality of ratings.

3. The method of claim 1 wherein each of the plurality of ratings is selectable to provide additional information about one or more of the plurality of ratings and the plurality of users.

4. The method of claim 3 wherein the additional information comprises one or more of a user identity, detailed rating information, expertise level of the user, circle of trust level of the user, and a rating by a user for a plurality of items.

5. The method of claim 1 further comprising:
    displaying a selectable image to invite additional users to rate the item.

6. The method of claim 1 wherein the relevance of each of the plurality of ratings is determined at least in part by a plurality of coefficients, the plurality of coefficients comprising coefficients selected from the group consisting of a trust level coefficient, an expertise coefficient, a timing coefficient, a similarity coefficient, and a ratings number coefficient.

7. The method of claim 6 wherein the plurality of coefficients are graphically illustrated by one or more of a grouping of the users, a connection line between the users, size, shape, color and symbol.

8. An article of manufacture comprising:
    a machine-readable storage medium storing instructions which, when executed by a processing system, cause the processing system perform a method for providing customized recommendations to an information recipient, the method comprising:
    displaying, in a first view of a user interface, a plurality of ratings provided for an item by a plurality of users, wherein each rating represents an individual use's rating of the item, and each rating is placed on a shape having a particular size among a plurality of shapes having different sizes;
    displaying, in the first view of the user interface, an indication of a one-to-one correspondence between each rating of the plurality of ratings and a distinct one of the plurality of users; and
    displaying, in the first view of the user interface, a plurality of relevance indicators, wherein each relevance indicator indicates a level of trust by the information recipient toward a corresponding individual user, and wherein each relevance indicator is a visual indicator that graphically illustrates a relevance of each rating of the plurality of ratings to the information recipient using a distance between a point corresponding to the information recipient and each of the plurality of shapes having different sizes.

9. An apparatus for providing customized recommendations to an information recipient, the apparatus comprising:
    means for displaying, in a first view of a user interface, a plurality of ratings provided for an item by a plurality of users, wherein each rating represents an individual user's rating of the item, and each rating is placed on a shape having a particular size among a plurality of shapes having different sizes;
    means for displaying, in the first view of the user interface, an indication of a one-to-one correspondence between each rating of the plurality of ratings and a distinct one of the plurality of users; and
    means for displaying, in the first view of the user interface, a plurality of relevance indicators, wherein each relevance indicator indicates a level of trust by the information recipient toward a corresponding individual user providing a rating of the plurality of ratings, and wherein each relevance indicator is a visual indicator that graphically illustrates a relevance of each rating of the plurality of ratings to the information recipient using a distance between a point corresponding to the information recipient and each of the plurality of shapes having different sizes.

10. A system for providing customized recommendations to an information recipient, the system comprising:
- a computer;
- a display device connected to the computer;
- a recommendation database to store a plurality of ratings provided for an item by a plurality of users, wherein each rating represents an individual user's rating of the item, and each rating is placed on a shape having a particular size among a plurality of shapes having different sizes; and
- a recommendation presenter to generate and display a first view of a user interface, the first view presenting the plurality of ratings, an indication of a one-to-one correspondence between each rating of the plurality of ratings and a distinct one of the plurality of users, and a plurality of relevance indicators, wherein each relevance indicator indicates a level of trust by the information recipient toward a corresponding individual user providing a rating of the plurality of ratings, and wherein each relevance indicator is a visual indicator that graphically illustrates a relevance of each rating of the plurality of ratings to the information recipient using a distance between a point corresponding to the information recipient and each of the plurality of shapes having different sizes.

* * * * *